United States Patent
Yokokawa et al.

(10) Patent No.: US 8,929,404 B2
(45) Date of Patent: Jan. 6, 2015

(54) RECEPTION APPARATUS AND METHOD, PROGRAM AND RECEPTION SYSTEM

(75) Inventors: Takashi Yokokawa, Kanagawa (JP); Satoshi Okada, Tokyo (JP)

(73) Assignee: Sony Corporation, Tokyo (JP)

(*) Notice: Subject to any disclaimer, the term of this patent is extended or adjusted under 35 U.S.C. 154(b) by 945 days.

(21) Appl. No.: 12/981,894

(22) Filed: Dec. 30, 2010

(65) Prior Publication Data

US 2011/0164628 A1   Jul. 7, 2011

(30) Foreign Application Priority Data

Jan. 6, 2010  (JP) .................. 2010-000918

(51) Int. Cl.
| | |
|---|---|
| H04J 3/06 | (2006.01) |
| H04L 25/02 | (2006.01) |
| H04N 21/43 | (2011.01) |
| H04L 27/26 | (2006.01) |

(52) U.S. Cl.
CPC ............ *H04L 25/02* (2013.01); *H04N 21/4305* (2013.01); *H04L 27/26* (2013.01)
USPC ........................... 370/503; 370/509; 370/512

(58) Field of Classification Search
CPC .......... H04N 21/4302; H04N 21/4305; H04N 21/4307
See application file for complete search history.

(56) References Cited

U.S. PATENT DOCUMENTS

| | | |
|---|---|---|
| 2004/0213298 A1 | 10/2004 | Sato |
| 2006/0168524 A1 | 7/2006 | Saeki |
| 2010/0284472 A1* | 11/2010 | Liao et al. ................. 375/240.26 |
| 2011/0131464 A1* | 6/2011 | Ko et al. ........................ 714/752 |
| 2011/0164703 A1* | 7/2011 | Yokokawa et al. ........... 375/316 |

FOREIGN PATENT DOCUMENTS

| | | |
|---|---|---|
| EP | 1 615 433 A1 | 1/2006 |
| JP | 10-136308 A | 5/1998 |
| JP | 2002-84261 A | 3/2002 |
| JP | 2002-330433 A | 11/2002 |

OTHER PUBLICATIONS

"Digital Video Broadcasting (DVB); Frame structure channel coding and modulation for a second generation digital terrestrial]l television broadcasting system (DVB-T2)", ETSI EN 302 755 v1.1.1 (Sep. 2009), European Standard (Telecommunications series), 167 pages.*

(Continued)

*Primary Examiner* — Andrew Chriss
*Assistant Examiner* — Salvador E Rivas
(74) *Attorney, Agent, or Firm* — Oblon, Spivak, McClelland, Maier & Neustadt, L.L.P.

(57) ABSTRACT

Disclosed herein is a reception apparatus, including: a reception section configured to receive an OFDM (orthogonal frequency division multiplexed) signal obtained by modulating a common packet sequence configured from a packet common to a plurality of streams and a data packet sequence configured from packets individually unique to the plural streams; a buffer configured to accumulate packets of the common packet sequence and the data packet sequence obtained by demodulating the received OFDM signal; a retaining section configured to retain correction information for correcting out-of-synchronism between the common packet sequence and the data packet sequence obtained from particular packets of the common packet sequence and the data packet sequence upon reading out of the packets accumulated in the buffer; and a correction section configured to correct the out-of-synchronism of the packet which suffers from the out-of-synchronism of the packets based on the correction information retained in the retaining section.

13 Claims, 18 Drawing Sheets

(56) References Cited

OTHER PUBLICATIONS

"Digital Video Broadcasting (DVB); Frame structure channel coding and modulation for a second generation digital terrestrial television broadcasting system (DVB-T2)", ETSI EN 302 755 v1.1.1 (Sep. 2009), European Standard (Telecommunications series), 167 pages.
U.S. Appl. No. 12/981,948, filed Dec. 30, 2010, Yokokawa, et al.
Extended European Search Report issued Aug. 4, 2011, in Patent Application No. 10197237.0.
"Frame structure channel coding and modulation for a second generation digital terrestrial television broadcasting system (DVB-T2)", Digital Video Broadcasting, http://www.dvb.org/technology/dvbt2/a122.tm3980r5.DVB-T2.pdf. XP 2546005, Jun. 2008, pp. 1-158.
Office Action issued Oct. 29, 2013 in Japanese Patent Application No. 2010-000918.

* cited by examiner

RECEPTION APPARATUS AND METHOD, PROGRAM AND RECEPTION SYSTEM

BACKGROUND OF THE INVENTION

1. Field of the Invention

This invention relates to a reception apparatus and method, a program and a reception system, and particularly to a reception apparatus and method, a program and a reception system by which synchronism can be re-established.

2. Description of the Related Art

In recent years, as a system for transmitting a digital signal, a modulation system called orthogonal frequency division multiplexing (OFDM) system is used. In the OFDM system, a large number of orthogonal subcarriers are prepared in a transmission band, and data are applied to the amplitude and the phase of each subcarrier to digitally modulate the data by PSK (Phase Shift Keying) or QAM (Quadrature Amplitude Modulation).

The OFDM system is frequently applied to terrestrial digital broadcasting which is influenced much by a multipath disturbance. As a standard for terrestrial digital broadcasting which adopts the OFDM system, such standards as, for example, DVB-T (Digital Video Broadcasting-Terrestrial) and ISDB-T (Integrated Services Digital Broadcasting-Terrestrial) are available.

Incidentally, DVB (Digital Video Broadcasting)-T.2 as a standard for terrestrial digital broadcasting of the next generation is being established by the ETSI (European Telecommunication Standards Institute) (refer to "Frame structure channel coding and modulation for a second generation digital terrestrial broadcasting system (VBG-T2)," DVB Document A122, June 2008.

SUMMARY OF THE INVENTION

DVB-T.2 uses a system called M-PLP (Multiple PLP (Physical Layer Pipe)). In the M-PLP system, data are transmitted using a packet sequence called Common PLP formed from a common packet extracted from a plurality of transport streams (hereinafter referred to as TSs) and a packet sequence called Data PLP formed from the TSs from which such common packets are extracted. In other words, it can be considered that the Common PLP is configured from packets common to a plurality of TSs while the Data PLP is configured from packets which are unique to the individual TSs. The reception side restores one TS from the Common PLP and the Data PLP.

In order to restore the TS, it is necessary for the reception side to establish synchronism between a Common PLP and a Data PLP. However, if a wrong signal caused by a reception channel environment or the like is received after synchronism between a Common PLP and a Data PLP is established and a steady state is entered, then the synchronism between a Common PLP and a Data PLP is sometimes lost. In this instance, it is required to carry out re-establishment of synchronism between a Common PLP and a Data PLP rapidly.

Thus, it is desirable to provide a reception apparatus and method, a program and a reception system by which synchronism can be re-established rapidly after synchronism between different packet sequences such as a Common PLP and a Data PLP is lost.

According to an embodiment of the present invention, there is provided a reception apparatus including reception means for receiving an OFDM (orthogonal frequency division multiplexed) signal obtained by modulating a common packet sequence configured from a packet common to a plurality of streams and a data packet sequence configured from a plurality of packets individually unique to the plural streams, a buffer for accumulating packets of the common packet sequence and the data packet sequence obtained by demodulating the received OFDM signal, retaining means for retaining correction information for correcting out-of-synchronism between the common packet sequence and the data packet sequence obtained from particular packets of the common packet sequence and the data packet sequence upon reading out of the packets accumulated in the buffer, and correction means for correcting the out-of-synchronism of the packet which suffers from the out-of-synchronism of the packets based on the correction information retained in the retaining means.

Preferably, the correction information includes addresses of the buffer when the packets of the common packet sequence and the data packet sequence which are in synchronism with each other are written into the buffer and a difference information showing a difference between readout timings of the packets of the packet sequences, and, upon reading out of the packets accumulated in the buffer, if, when time of the difference information elapses after one of the read addresses reaches one of the addresses retained in the retaining means, the other read address of the buffer does not coincide with the other address retained in the retaining means, then the other read address of the buffer is replaced with the other address retained in the retaining means to correct the read address of the buffer with regard to the packet which suffers from the out-of-synchronism.

The common packet sequence and the data packet sequence may be Common PLPs and Data PLPs, respectively, produced from a plurality of streams in accordance with the M-PLP (Multiple PLP (Physical Layer Pipe)) system of DVB-T (Digital Video Broadcasting-Terrestrial).2.

Preferably, the addresses included in the correction information are addresses when the Common PLP and the Data PLP which are in synchronism with each other depending upon TTO (Time to Output) which is added to each of the particular packets and indicates a timing of reading out of the packet are written into the buffer, and the difference information is a difference value of the TTOs added to the particular packets of the Common PLP and the Data PLP which are in synchronism with each other depending upon the TTOs.

The difference value may be a number of packets corresponding to the difference between the TTOs.

Further, according to the embodiment of the present invention, there is provided a reception method for a reception apparatus which includes a buffer, including the steps of receiving an OFDM signal obtained by modulating a common packet sequence configured from a packet common to a plurality of streams and a data packet sequence configured from a plurality of packets individually unique to the plural streams, controlling, when packets of the common packet sequence and the data packet sequence obtained by demodulating the received OFDM signal and accumulated in the buffer are read out, retention of correction information for correcting out-of-synchronism between the common packet sequence and the data packet sequence obtained from particular packets of the common packet sequence and the data packet sequence, and correcting the out-of-synchronism of the packet which suffers from the out-of-synchronism of the packets based on the retained correction information.

Furthermore, according to the embodiment of the present invention, there is provided a program for being executed by an apparatus which includes a buffer, including the steps of receiving an OFDM signal obtained by modulating a common packet sequence configured from a packet common to a plurality of streams and a data packet sequence configured from a plurality of packets individually unique to the plural streams, controlling, when packets of the common packet sequence and the data packet sequence obtained by demodulating the received OFDM signal and accumulated in the buffer are read out, retention of correction information for correcting out-of-synchronism between the common packet sequence and the data packet sequence obtained from particular packets of the common packet sequence and the data packet sequence, and correcting the out-of-synchronism of the packet which suffers from the out-of-synchronism of the packets based on the retained correction information.

In the reception apparatus, reception method and program, an OFDM signal obtained by modulating a common packet sequence configured from a packet common to a plurality of streams and a data packet sequence configured from a plurality of packets individually unique to the plural streams. Then, when packets of the common packet sequence and the data packet sequence obtained by demodulating the received OFDM signal and accumulated in the buffer are read out, correction information for correcting out-of-synchronism between the common packet sequence and the data packet sequence obtained from particular packets of the common packet sequence and the data packet sequence is retained. Then, the out-of-synchronism of the packet which suffers from the out-of-synchronism of the packets is corrected based on the retained correction information.

According to another embodiment of the present invention, there is provided a reception system including acquisition means for acquiring, through a transmission line, an OFDM signal obtained by modulating a common packet sequence configured from a packet common to a plurality of streams and a data packet sequence configured from a plurality of packets individually unique to the plural streams, and a transmission line decoding processing section adapted to carry out a transmission line decoding process including at least a decoding process of the packet streams for the signal acquired through the transmission line, the transmission line decoding processing section including a buffer for accumulating packets of the common packet sequence and the data packet sequence obtained by demodulating the OFDM signal acquired through the transmission line, retaining means for retaining correction information for correcting out-of-synchronism between the common packet sequence and the data packet sequence obtained from particular packets of the common packet sequence and the data packet sequence upon reading out of the packets accumulated in the buffer, and correction means for correcting the out-of-synchronism of the packet which suffers from the out-of-synchronism of the packets based on the correction information retained in the retaining means.

According to a further embodiment of the present invention, there is provided a reception system including a transmission line decoding processing section adapted to carry out, for an OFDM signal obtained by modulating a common packet sequence configured from a packet common to a plurality of streams and a data packet sequence configured from a plurality of packets individually unique to the plural streams and acquired through a transmission line, a transmission line decoding process including at least a decoding process of the packet streams, and an information source decoding processing section adapted to carry out, for the signal for which the transmission line decoding process is carried out, an information source decoding process including at least a process of decompressing compressed information into original information, the transmission line decoding processing section including a buffer for accumulating packets of the common packet sequence and the data packet sequence obtained by demodulating the OFDM signal acquired through the transmission line, retaining means for retaining correction information for correcting out-of-synchronism between the common packet sequence and the data packet sequence obtained from particular packets of the common packet sequence and the data packet sequence upon reading out of the packets accumulated in the buffer, and correction means for correcting the out-of-synchronism of the packet which suffers from the out-of-synchronism of the packets based on the correction information retained in the retaining means.

According to a still further embodiment of the present invention, there is provided a reception system including a transmission line decoding processing section adapted to carry out, for an OFDM signal obtained by modulating a common packet sequence configured from a packet common to a plurality of streams and a data packet sequence configured from a plurality of packets individually unique to the plural streams and acquired through a transmission line, a transmission line decoding process including at least a decoding process of the packet streams, and an outputting section adapted to output an image or sound based on the signal for which the transmission line decoding process is carried out, the transmission line decoding processing section including a buffer for accumulating packets of the common packet sequence and the data packet sequence obtained by demodulating the OFDM signal acquired through the transmission line, retaining means for retaining correction information for correcting out-of-synchronism between the common packet sequence and the data packet sequence obtained from particular packets of the common packet sequence and the data packet sequence upon reading out of the packets accumulated in the buffer, and correction means for correcting the out-of-synchronism of the packet which suffers from the out-of-synchronism of the packets based on the correction information retained in the retaining means.

According to a yet further embodiment of the present invention, there is provided a reception system including a transmission line decoding processing section adapted to carry out, for an OFDM signal obtained by modulating a common packet sequence configured from a packet common to a plurality of streams and a data packet sequence configured from a plurality of packets individually unique to the plural streams and acquired through a transmission line, a transmission line decoding process including at least a decoding process of the packet streams, and a recording section adapted to record the signal for which the transmission line decoding process is carried out, the transmission line decoding processing section including a buffer for accumulating packets of the common packet sequence and the data packet sequence obtained by demodulating the OFDM signal acquired through the transmission line, retaining means for retaining correction information for correcting out-of-synchronism between the common packet sequence and the data packet sequence obtained from particular packets of the common packet sequence and the data packet sequence upon reading out of the packets accumulated in the buffer, and correction means for correcting the out-of-synchronism of the packet which suffers from the out-of-synchronism of the packets based on the correction information retained in the retaining means.

In the reception systems, when packets, accumulated in the buffer, of a common packet sequence configured from a packet common to a plurality of streams obtained by modulating an OFDM signal and a data packet sequence configured from a plurality of packets individually unique to the plural streams are read out, correction information for correcting out-of-synchronism between the common packet sequence and the data packet sequence obtained from particular packets of the common packet sequence and the data packet sequence is retained. Then, the out-of-synchronism of the packet which suffers from the out-of-synchronism of the packets is corrected based on the retained correction information.

The reception apparatus may be an independent apparatus or an internal block which composes one apparatus.

The program can be provided by transmission thereof through a transmission medium or in the form of a recording medium in or on which it is recorded.

In summary, according to the present invention, re-establishment of synchronism can be carried out rapidly.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

In the following, preferred embodiments of the present invention are described with reference to the accompanying drawings.
Outline of the General Configuration FIG. 1 shows an outline of a configuration of a transmitter (Tx) and a receiver (Rx) in the case where the M-PLP system is used in DVB-T.2.

Figure 1:
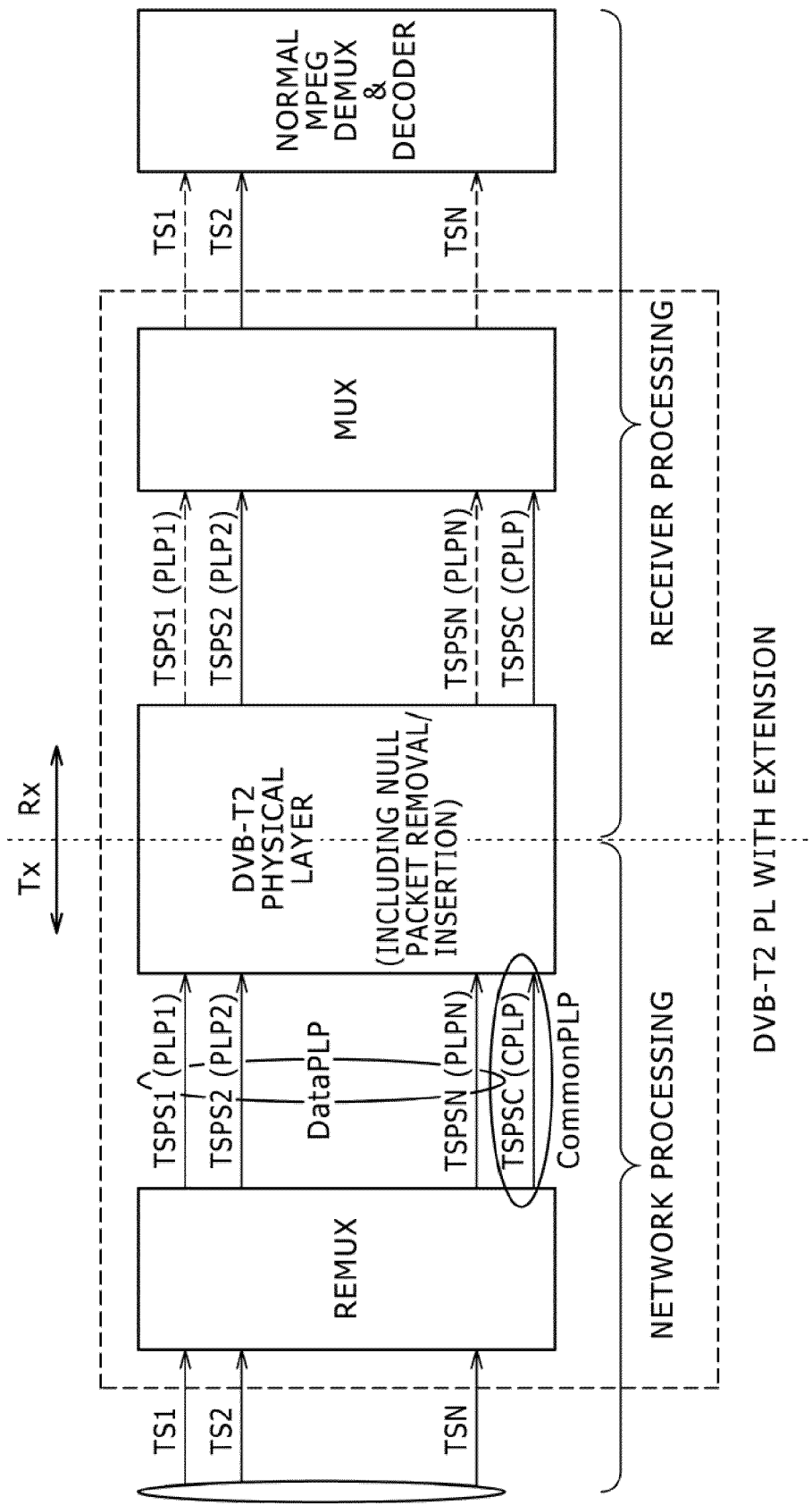
FIG. 1 is a block diagram showing a general configuration of a transmitter and a receiver where the M-PLP method is used in DVB-T.2.

Referring to FIG. 1, the transmitter side operates in the following manner. In particular, when a plurality of TSs such as TSs TS1 to TSN in FIG. 1 are inputted at a fixed bit rate, common packets are extracted from packets which configure the TSs to produce a packet sequence (TSPSC (CPLP) in FIG. 1) which is called Common PLP. Further, the TSs from which the common packets are extracted called Data PLPs such as packet sequences TSPS1 (PLP1) to TSPSN (PLPN).

In particular, on the transmitter side, N Data PLPs and one Common PLP are produced from N TSs. Consequently, an encoding ratio in error correction and a modulation system such as the OFDM system can be applied adaptively to each PLP. It is to be noted that, in the case where the term PLP is used solely in the description of the present embodiment, it includes both of the Common PLP and a Data PLP. Further, in the case where the term Common PLP and the term Data PLP are used, they include significance of individual packets which configure the Common PLP and the Data PLP.

For example, in the case of a TS (Transport Stream) packet of MPEG, some of a plurality of Data PLPs include the same information like control information such as an SDT (Service Description Table) or an EIT (Event Information Table) or the like. By cutting out and transmitting such common information as a Common PLP, drop of the transmission efficiency can be prevented.

On the other hand, the receiver side demodulates a plurality of Data PLPs (TSPS1 (PLP1) to TSPSN (PLPN) in FIG. 1) and Common PLP (TSPSC(CPLP) in FIG. 1) received thereby using a demodulation system such as the OFDM system. Then, the receiver side extracts only a desired PLP (TSPS2 (PLP2) in FIG. 1) and carries out an error correction process for the PLP. By this, a desired TS can be reconstructed.

For example, if the Data PLP TSPS2 (PLP2) is selected from among the Data PLPs TSPS1 (PLP1) to TSPSN (PLPN) as seen in FIG. 1, then the TS TS2 is reconstructed using the Data PLP TSPS2 (PLP2) and the Common PLP TSPSC (CPLP). Therefore, if one Data PLP and the common PLP are extracted, then the TS can be reconstructed, and consequently, there is such a merit that the operation efficiency of the receiver is improved.

Then, the TS reconstructed by the receiver side is outputted to a decoder on the succeeding stage. The decoder applies, for example, MPEG decoding to decode coded data included in the TS and outputs data of an image or sound obtained as a result of the MPEG decoding.

As described above, if the M-PLP system is used in DVB-T.2, then on the transmitter Tx side, N Data PLPs and one Common PLP are produced from N TSs and transmitted. On the receiver Rx side, a desired TS is reconstructed or reproduced from a desired Data PLP and the one Common PLP.
Example of the Configuration of the Reception Apparatus FIG. 2 shows a configuration of a reception apparatus to which the present invention is applied.

Figure 2:
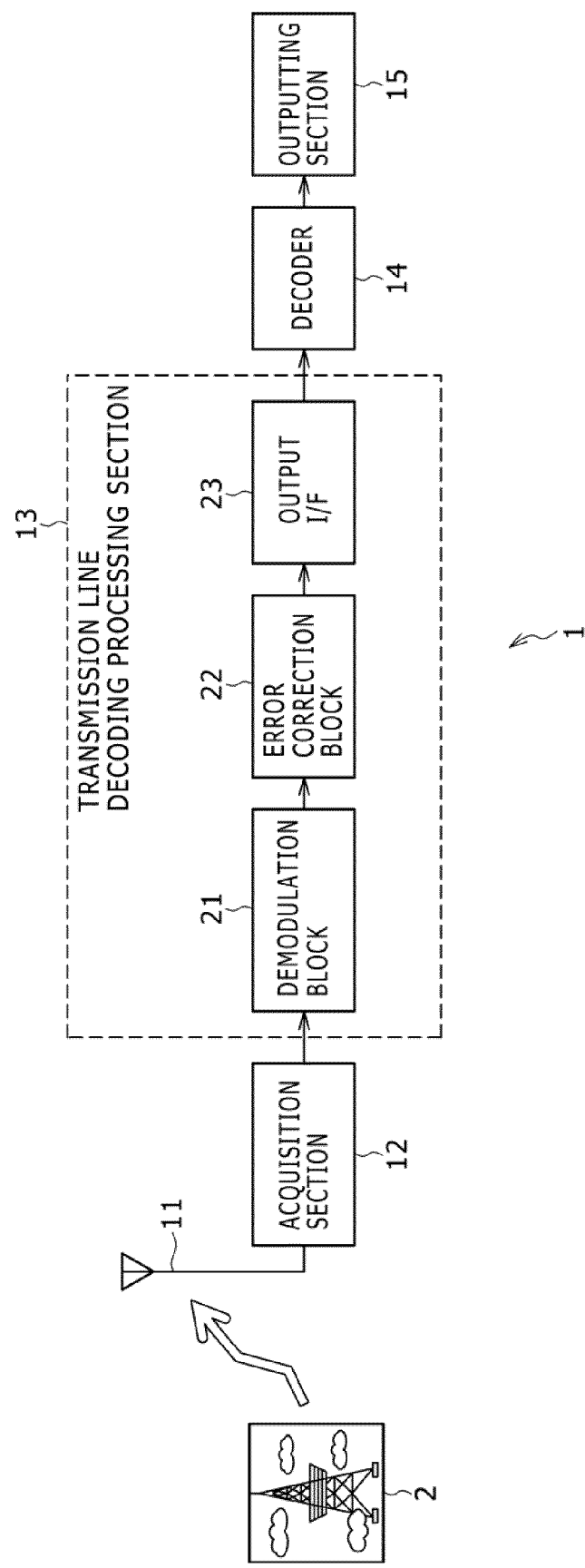
FIG. 2 is a block diagram showing a configuration of a reception apparatus to which the present invention is applied.

It is to be noted that, in FIG. 2, the reception apparatus 1 corresponds to the receiver Rx shown in FIG. 1, and a transmission apparatus 2 corresponds to the transmitter Tx shown in FIG. 1.

The reception apparatus 1 of FIG. 2 receives a signal of digital broadcasting transmitted thereto from the transmission apparatus 2. This signal is an OFDM signal which is obtained by applying such processes as error correction and OFDM modulation to PLPs from TSs using the M-PLP system adopted as standards for terrestrial digital broadcasting of the next generation in DVB-T.2 which is being currently set.

In particular, the transmission apparatus 2, for example, in a broadcasting station transmits an OFDM signal of digital broadcasting through a transmission line. The reception apparatus 1 receives the OFDM signal transmitted thereto from the transmission apparatus 2, carries out a transmission line decoding process including a decoding process and an error correction process, and outputs decoded data obtained by the transmission line decoding process to the succeeding stage.

Referring to FIG. 2, the reception apparatus 1 includes an antenna 11, an acquisition section 12, a transmission line decoding processing section 13, a decoder 14 and an outputting section 15.

The antenna 11 receives the OFDM signal transmitted thereto from the transmission apparatus 2 through the transmission line and supplies the received OFDM signal to the acquisition section 12.

The acquisition section 12 is configured, for example, from a tuner, a set top box (STB) or the like, and carries out frequency conversion to convert the OFDM signal in the form of a RF signal received by the antenna 11 into an IF (Intermediate Frequency) signal. The acquisition section 12 supplies the IF signal to the transmission line decoding processing section 13.

The transmission line decoding processing section 13 carries out necessary processes such as demodulation and error correction for the OFDM signal from the acquisition section 12, reconstructs a TS from PLPs obtained by the processes and supplies the TS to the decoder 14.

The transmission line decoding processing section 13 includes a demodulation block 21, an error correction block 22 and an output interface (I/F) 23.

The demodulation block 21 carries out a demodulation process for the OFDM signal from the acquisition section 12 and outputs desired Data PLPs and one Common PLP obtained as a decoded signal by the demodulation process to the error correction block 22.

The error correction block 22 carries out a predetermined error correction process for the PLPs of the demodulation signal obtained from the demodulation block 21 and outputs PLPs obtained by the error correction process to the output I/F 23.

It is to be noted here that, by the transmission apparatus 2, for example, data of an image and sound as a broadcasting program are encoded by MPEG (Moving Picture Experts Group) encoding, and PLPs produced from a TS configured from TS packets in which the MPEG encoded data are included are transmitted as an OFDM signal.

Further, by the transmission apparatus 2, PLPs are encoded into codes such as, for example, RS (Reed Solomon) codes or LDPC (Low Density Parity Check) codes as a countermeasure against errors which may appear on the transmission line. Accordingly, the error correction block 22 carries out a process of decoding the codes as an error correction encoding process.

The output I/F 23 reconstructs a TS from the PLPs supplied thereto from the error correction block 22 and carries out an outputting process of outputting the reconstructed TS at a predetermined fixed rate (hereinafter referred to as TS rate) to the outside. It is to be noted that details of the configuration of the output I/F 23 are hereinafter described with reference to FIG. 3.

The decoder 14 carries out MPEG decoding of the coded data included in the TS supplied thereto from the output I/F 23 and supplies data of an image and sound obtained by the MPEG decoding to the outputting section 15.

The outputting section 15 is configured, for example, from a display unit and a speaker, and displays an image and outputs sound based on the data of an image and sound supplied thereto from the decoder 14.

The reception apparatus 1 is configured in such a manner as described above.

Detailed Example of the Configuration of the Output I/F

Figure 3:
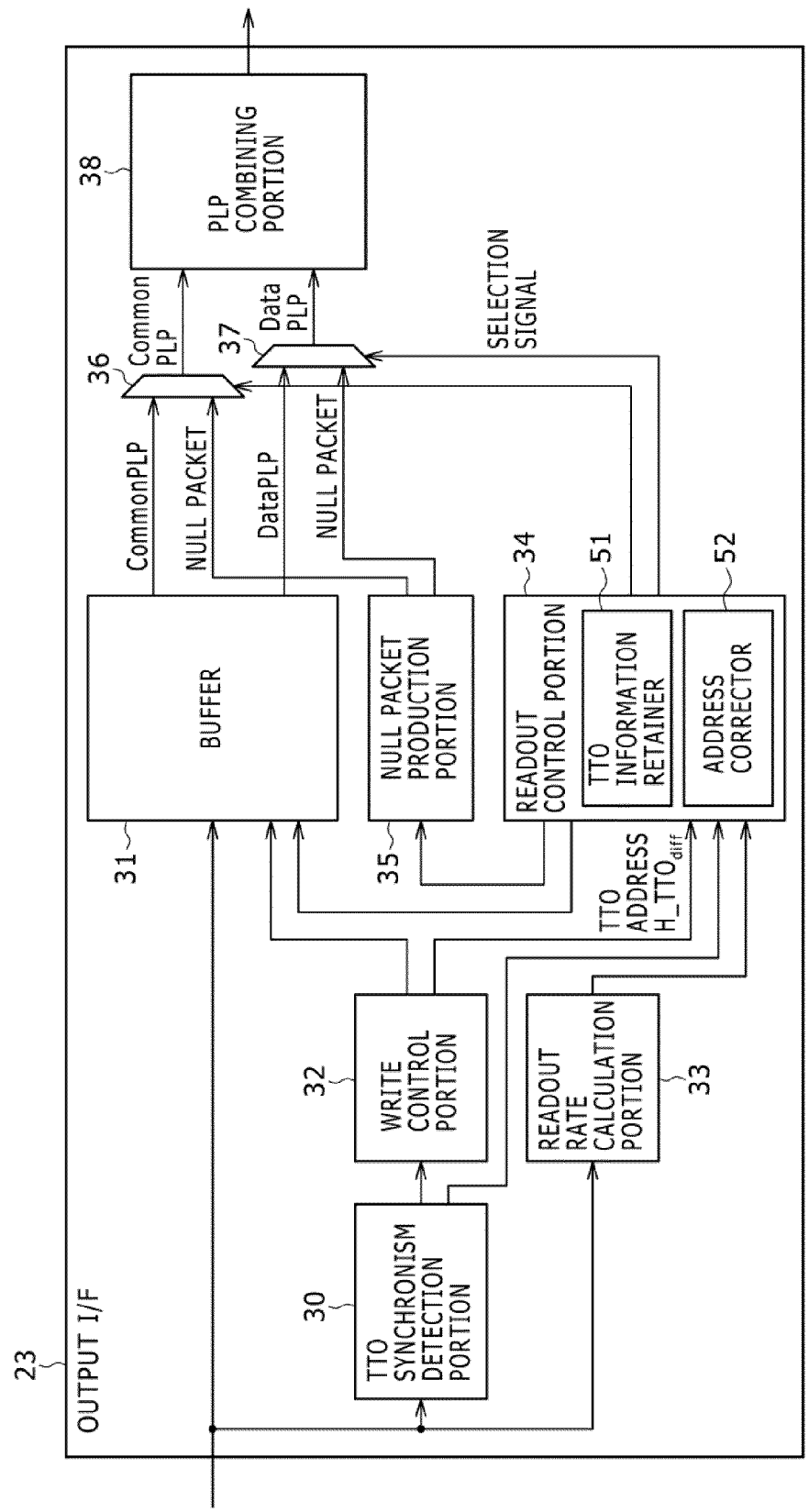
FIG. 3 is a block diagram showing an example of a configuration of an output I/F shown in FIG. 2.

FIG. 3 shows an example of a configuration of the output I/F 23 shown in FIG. 2.

Referring to FIG. 3, the output I/F 23 includes a TTO synchronism detection portion 30, a buffer 31, a write control portion 32, a readout rate calculation portion 33, a readout control portion 34, a Null packet production portion 35, a selector 36, another selector 37 and a PLP combining portion 38.

PLPs supplied from the error correction block 22, that is, a common PLP and Data PLPs, are supplied to the TTO synchronism detection portion 30, buffer 31 and readout rate calculation portion 33.

To each of the Common PLP and the Data PLPs, information, that is, signaling values, called DNP (Deleted Null Packet) and ISSY (Input Stream Synchronizer), is added in a unit of a TS packet.

ISSY includes information of ISCR (Input Stream Time Reference), BUFS (Buffer Size), TTO (Time to Output) and so forth. ISCR is information indicative of a timestamp added on the transmission apparatus 2 side upon transmission of each TS packet. BUFS is information representative of a required buffer amount of the PLP. If this information is referred to, then the reception apparatus 1 can settle a buffer region. TTO is information representative of a period of time until a TS packet is outputted from the top of a P1 symbol placed in a TS frame in which processing for the TS packet is carried out.

Meanwhile, DNP is information which is added when the output I/F 23 operates in a mode called Null packet deletion mode hereinafter described, and successive Null packets are transmitted with a signal of one byte formed from the number of successive Null packets. For example, in the case where DNP=3, an original packet sequence can be reconstructed while it is determined that three Null packets appear successively in the reception apparatus 1.

The TTO synchronism detection portion 30 detects, from among the TTOs added to the TS packets of the PLPs supplied from the error correction block 22, those TTOs with which the Common PLP and the Data PLPs are synchronized with each other.

As a method of establishing synchronism using the TTO, it is carried out by specifying a combination of T2 frames synchronized with each other. This is because, since, for example, a TTO added to a TS packet is basically placed only at the top of a T2 frame, if T2 frames are in synchronism with each other, then it can be regarded that the TTOs added to TS packets in the T2 frames are in synchronism with each other.

It is to be noted that the specifying method is carried out briefly in the following manner. In particular, a T2 frame has a preamble signal called P1, and the preamble signal includes information required for such processes as demodulation of an OFDM signal. The T2 frame further includes another preamble signal called P2 in addition to the preamble signal P1, and the preamble signal P2 includes specifying information such as P_I and Ijump information in addition to information necessary for a demodulation process of the T2 frame.

Here, the information P_I is information representative of the number of T2 frames per one interleaving frame, and the information Ijump is information representative of the distance over which the pertaining PLPs are inserted in the T2 frames. The TTO synchronism detection portion 30 uses, for example, the specifying information described above and frame indexes F_i (Frame Index) allocated to the T2 frames of the PLPs to specify a combination of synchronized T2 frames.

A result of the detection of the TTO synchronism is supplied to the write control portion 32 and the readout control portion 34. The information regarding the PLPs acquired by the TTO synchronism detection portion 30 is supplied to the write control portion 32.

The buffer 31 successively accumulates the PLPs supplied thereto from the error correction block 22 under the writing control of the write control portion 32. Further, the buffer 31 supplies the Common PLPs from among the PLPs accumulated therein to the selector 36 and supplies the Data PLPs to the selector 37 under the reading control of the readout control portion 34.

The write control portion 32 carries out writing address control to the buffer 31 based on the information regarding the PLPs supplied thereto from the TTO synchronism detection portion 30 to accumulate the PLPs into the buffer 31.

Further, the write control portion 32 acquires write addresses (hereinafter referred to as TTO addresses) when TS packets which include TTOs which are in synchronism each other between the Common PLP and the Data PLPs are written into the buffer 31 based on the detection result of TTO synchronism supplied from the TTO synchronism detection portion 30 and differences (hereinafter referred to as differences $H\_TTO_{diff}$) of the TTOs of the PLPs and supplies the acquired addresses and differences $H\_TTO_{diff}$ to the readout control portion 34. In the following description, the TTO addresses and the differences $H\_TTO_{diff}$ are generally referred to as TTO information. The TTO information is used as correction information required to correct out-of-synchronism between the Common PLP and a Data PLP when such out-of-synchronism occurs upon reading out of the TS packets accumulated in the buffer 31.

Figure 10:
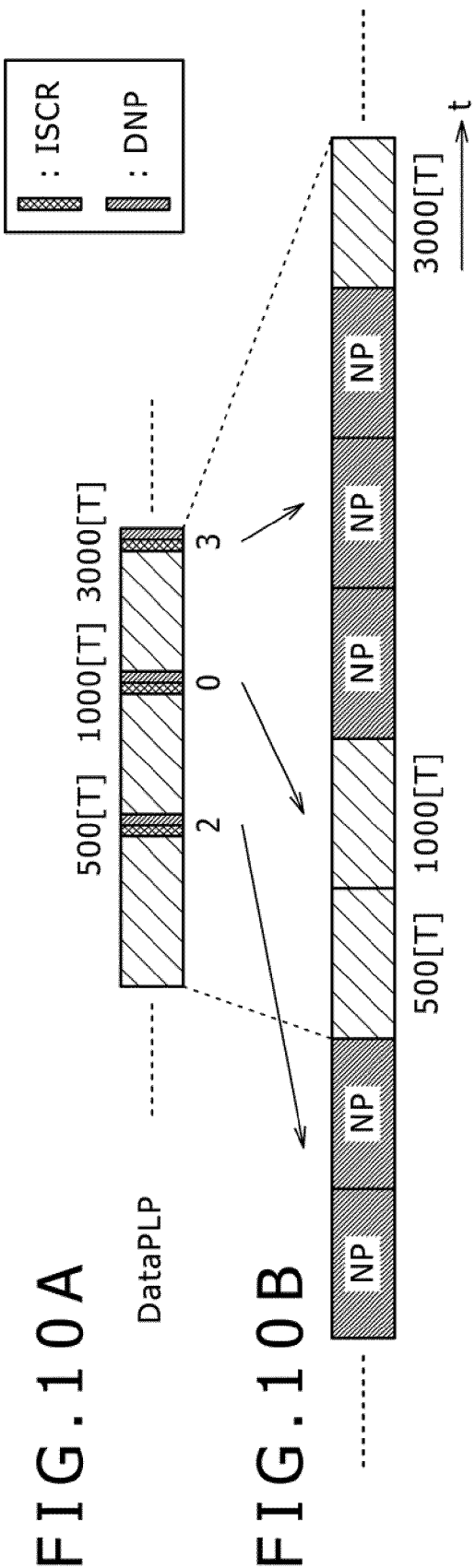
FIGS. 10A and 10B are diagrammatic views illustrating a calculation method of a TS rate.

The readout rate calculation portion 33 calculates a packet rate $P_{ts}$ which is a period of time per one packet and a TS rate $R_{TS}$ based on the PLPs supplied thereto from the error correction block 22 and supplies the calculated packet rate $P_{ts}$ and TS rate $R_{TS}$ to the readout control portion 34. Details of the calculation process of the packet rate $P_{ts}$ and the TS rate $R_{TS}$ carried out by the readout rate calculation portion 33 are hereinafter described with reference to FIG. 10.

The readout control portion 34 carries out address control of the buffer 31 so that a TS reconstructed from the PLPs read out from the buffer 31 may be outputted in accordance with the TS rate supplied thereto from the readout rate calculation portion 33.

In particular, the readout control portion 34 reads out the TTOs added to the TS packets which configure the T2 frames which are in a synchronous state with each other in accordance with the detection result of TTO synchronism supplied thereto from the TTO synchronism detection portion 30 and determines the difference $TTO_{diff}$ between the TTOs. Since this difference $TTO_{diff}$ corresponds to the displacement amount between the readout timings of the PS packets of the Common PLP and the Data PLP, if the readout control portion 34 displaces the readout timing of the TS packet in response to the difference $TTO_{diff}$, then the TS packets of the Common PLP and the Data PLP which are in synchronism with each other are read out and supplied to the PLP combining portion 38. It is to be noted that the difference $TTO_{diff}$ may be determined by the write control portion 32 and supplied to the readout control portion 34 upon writing of the TS packets.

Further, at this time, since a DNP is sometimes added to the TS packets, the readout control portion 34 controls the selectors 36 and 37 so that a number of Null packets corresponding to the value of the DNP may be supplied to the PLP combining portion 38.

The Null packet production portion 35 produces and supplies Null packets to the selectors 36 and 37 under the control of the readout control portion 34.

The readout control portion 34 carries out a process of re-establishing, when synchronism between a Common PLP and a Data PLP is lost, synchronism between the PLPs. In order to carry out the re-synchronization process, a TTO information retainer 51 and an address corrector 52 are provided in the readout control portion 34.

The TTO information retainer 51 retains the TTO addresses and the differences $H\_TTO_{diff}$ supplied thereto from the write control portion 32, that is, retains the TTO information.

The address corrector 52 corrects the read address of the buffer 31 in regard to a TS packet which suffers from out-of-synchronism based on the TTO information retained in the TTO information retainer 51.

The correction method in this instance is such as follows. In particular, upon reading out of the TS packets accumulated in the buffer 31, it is decided whether or not, when the differences $H\_TTO_{diff}$ elapses after one read address reaches one TTO address, the other read address coincides with the other TTO address. When the other read address does not coincide with the other TTO address, the address corrector 52 decides that out-of-synchronism occurs, and corrects the other read address to the other TTO address.

Details of the readout control process of TS packets carried out by the readout control portion 34 are hereinafter described with reference to FIGS. 12 and 13.

The selector 36 selects one of a TS packet of a Common PLP from the buffer 31 and a Null packet from the Null packet production portion 35 in response to a selection signal from the readout control portion 34. In this instance, if a DNP is added to the TS packet of the Common PLP, then Null packets corresponding to the value of the DNP are supplied to the PLP combining portion 38. Similarly, the selector 37 selects one of a TS packet of a Data PLP and a Null packet and supplies the selected packet to the PLP combining portion 38.

To the PLP combining portion 38, a Common PLP supplied from the selector 36 and a Data PLP supplied from the selector 37 are inputted in synchronism with each other. The PLP combining portion 38 combines the PLPs to reconstruct a TS and supplies the TS at the TS rate to the decoder 14.

The output I/F 23 is configured in such a manner as described above.

Processing of the Transmission Apparatus

Now, details of transmission and reception processes carried out between the reception apparatus 1 and the transmission apparatus 2 are described with reference to FIGS. 4 to 13. Here, processing carried out by the transmission apparatus 2 is described first with reference to FIGS. 4 to 6, and then processing carried out by the reception apparatus 1 is described with reference to FIGS. 7 to 13.

It is to be noted that, in the description of the transmission and reception processes given below, it is assumed for simplified description that four TSs TS1 to TS4 are inputted to the transmission apparatus 2 and PLPs produced from the TSs are subjected to such processes as error correction and OFDM modulation and then transmitted to the reception apparatus 1.

Figure 4:
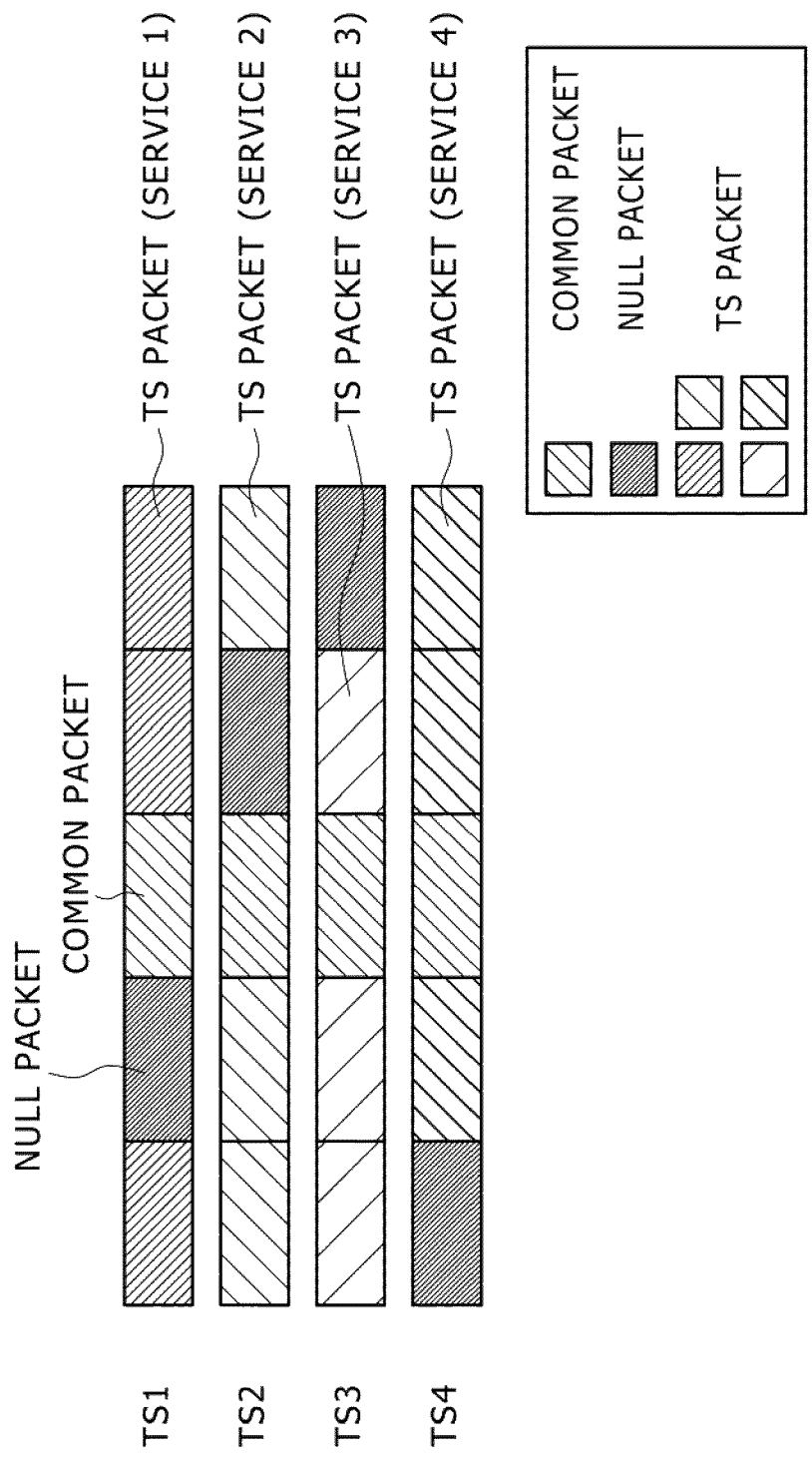
FIG. 4 is a diagrammatic view illustrating a configuration of packets on the transmission side.

Referring first to FIG. 4, five rectangles of each of the TSs TS1 to TS4 individually represent packets. In the present embodiments, the packets which configure each TS are classified into three different packets including a TS packet, a Null packet and a common packet.

The TS packet contains data for proving various services, which are, in FIG. 4, services 1 to 4, such as, for example, MPEG encode data. Meanwhile, the Null packet contains data for adjustment which are transmitted in order to keep the amount information, which is to be outputted from the transmission side, fixed when the transmission side has no data to be transmitted. For example, the Null packet prescribed in MPEG is a TS packet which has 0×47, 0×1F, 0×FF and 0×1F as four bytes at the top thereof, and all is are adopted for the bits of the payload.

The common packet contains data which are common to a plurality of TSs. For example, in the case of MPEG, control information such as the SDT and the EIT described hereinabove corresponds to the common packet.

In particular, in the example of FIG. 4, the third packet from the left in the figure from among the five packets which configure each of the TSs TS1 to TS4 is a common packet. Since the common packets contain the same information, they are extracted as a common PLP as seen in FIG. 5.

Figure 5:
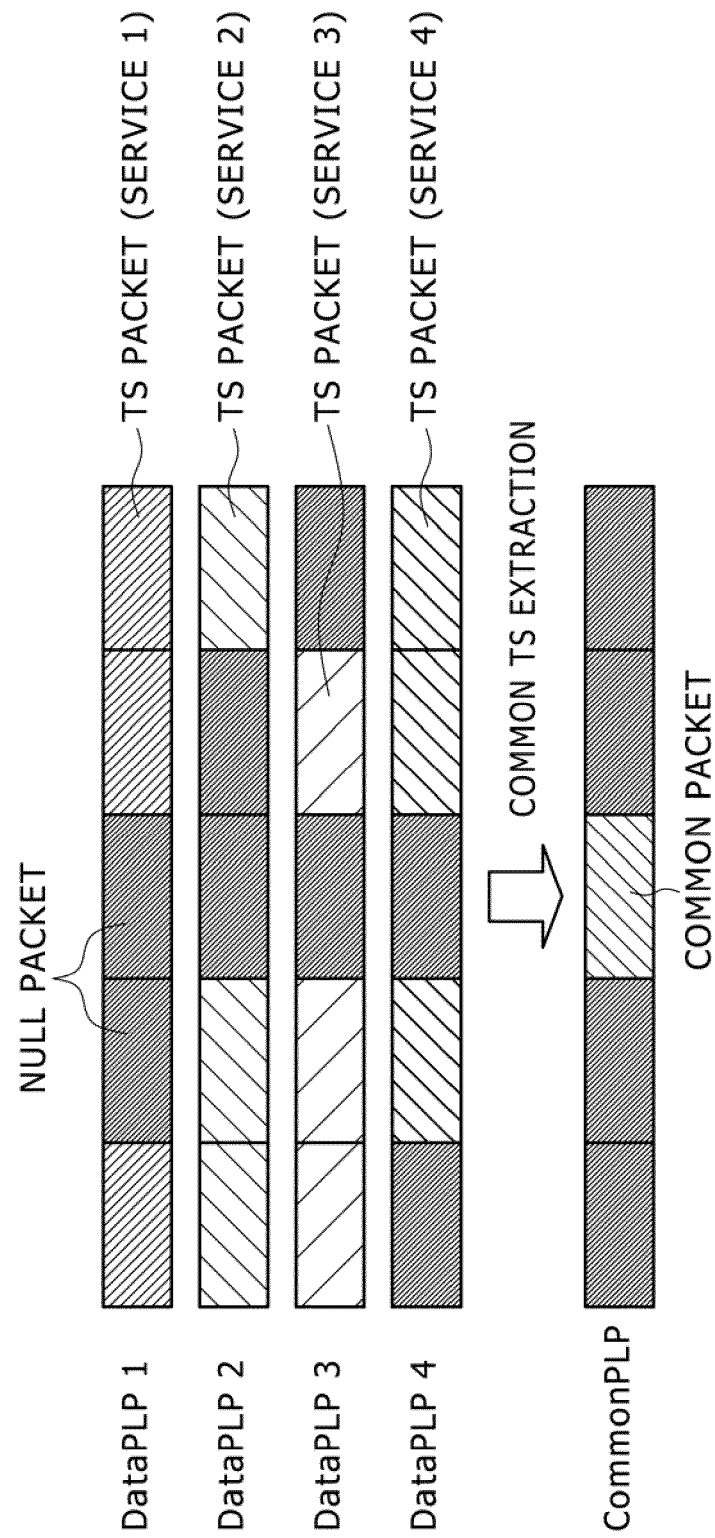
FIG. 5 is a similar view but illustrating a configuration of a Common PLP and a Data PLP on the transmission side.

In particular, if the TSs TS1 to TS4 of FIG. 4 contain a common packet, then the common packet is extracted as the Common PLP as seen in FIG. 5, and the extracted common packets are replaced by Null packets. Then, each of the TSs from which the common packet is extracted makes a sequence called Data PLP, that is, one of sequences Data PLP1 to Data PLP4.

In the case where the transmission apparatus 2 is operating in a mode called Null packet deletion mode, a Null packet is transmitted in the form of a signal (signaling) of 1 byte called DNP.

Figure 6:
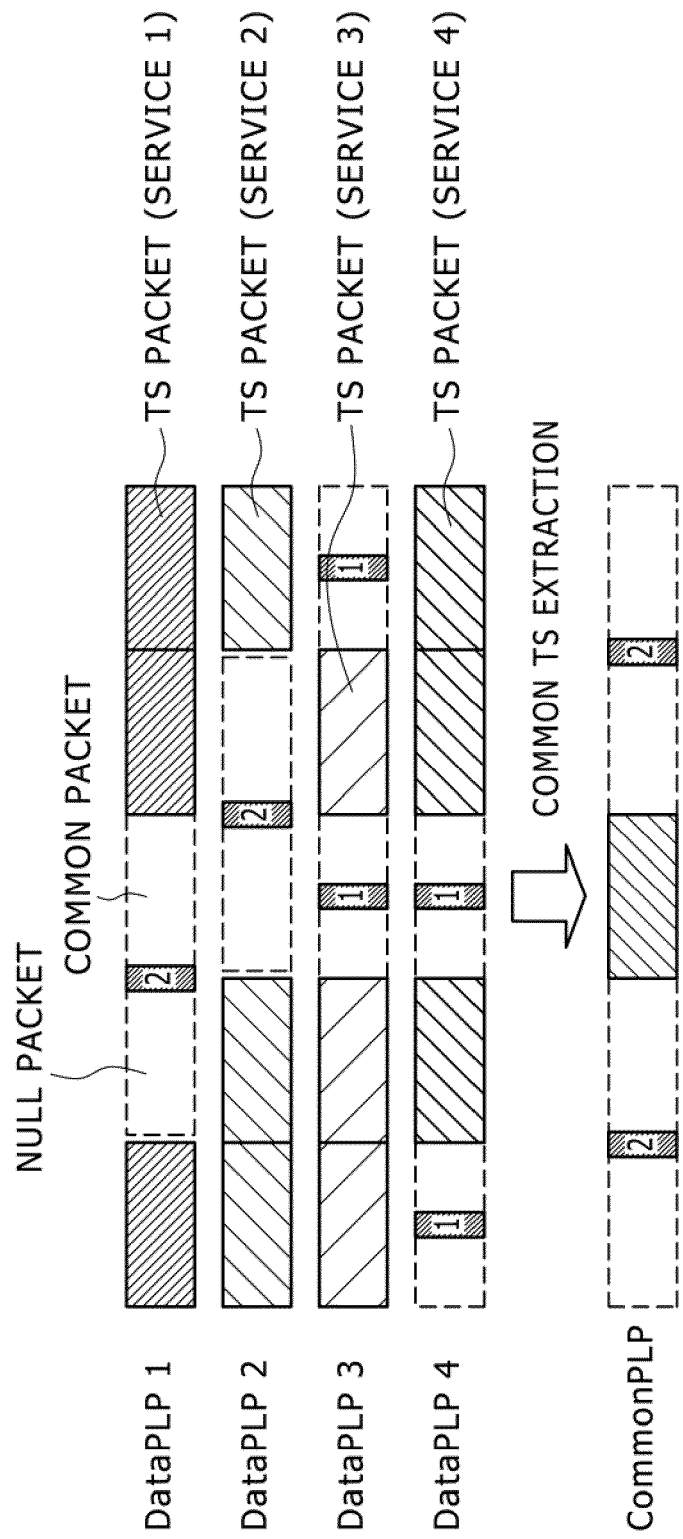
FIG. 6 is a similar view but illustrating a configuration of a Common PLP and a Data PLP in a Null packet deletion mode on the transmission side.

For example, in the sequence Data PLP1 illustrated in FIG. 5, the second and third packets from the left in the figure are Null packets, and in the case where two Null packets successively appear, they are replaced by a signal of 1 byte which has the value of 2 as seen in FIG. 6. In other words, the value of the DNP corresponds to the number of successively appearing Null packets. For example, in the sequence Data PLP3 shown in FIG. 5, since each of the third and fifth packets from the left in FIG. 5 is a Null packet by itself, each of them is replaced by a signal of 1 byte having the value of 1 as seen in FIG. 6.

If each Null packet is replaced by the DNP of 1 byte, then the sequences Data PLP1 to Data PLP4 and the common PLP illustrated in FIG. 5 come to have such a state as illustrated in FIG. 6. Consequently, the transmission apparatus 2 produces the sequences Data PLP1 to Data PLP4 and the common PLP.

In this manner, the transmission apparatus 2 produces four Data PLPs and one Common PLP from four TSs and carries out predetermined processes such as error correction and OFDM modulation for the produced signals. Then, the OFDM signal obtained by the predetermined processes is transmitted to the reception apparatus 1 through a predetermined transmission line.

Processing of the Reception Apparatus

Now, processing of the reception apparatus 1 is described with reference to FIGS. 7 to 13.

It is to be noted that it is assumed that an OFDM signal received by the reception apparatus 1 has been subjected to such processes as error correction and OFDM modulation in regard to the sequences Data PLP1 to Data PLP4 and the Common PLP of FIG. 6 in accordance with the processes of the transmission apparatus 2.

Figure 7:
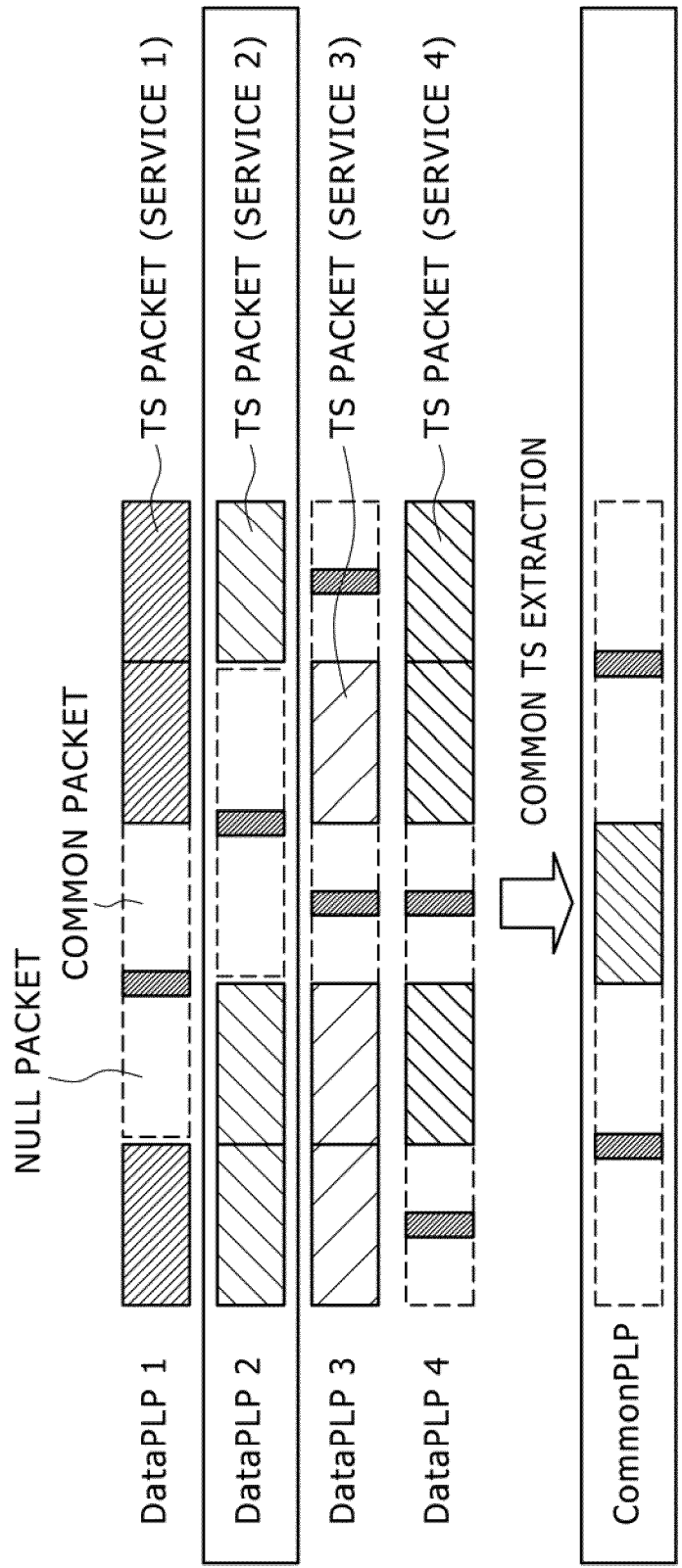
FIG. 7 is a similar view but illustrating a configuration of a Common PLP and a Data PLP on the reception side.

The reception apparatus 1 receives an OFDM signal transmitted thereto from the transmission apparatus 2 through the predetermined transmission line, and the demodulation block 21 carries out predetermined processing such as OFDM demodulation for the OFDM signal to acquire sequences Data PLP1 to Data PLP4 and a Common PLP illustrated in FIG. 7 corresponding to the sequences Data PLP1 to Data PLP4 and the Common PLP illustrated in FIG. 6, respectively. Then, for example, if the service 2 is selected by a user operation, then the sequence Data PLP2 from among the sequences Data PLP1 to Data PLP4 is extracted. The extracted sequence Data PLP2 and the Common PLP are subjected to predetermined processes such as error correction by the error correction block 22 and inputted to the output I/F 23.

Figure 8:
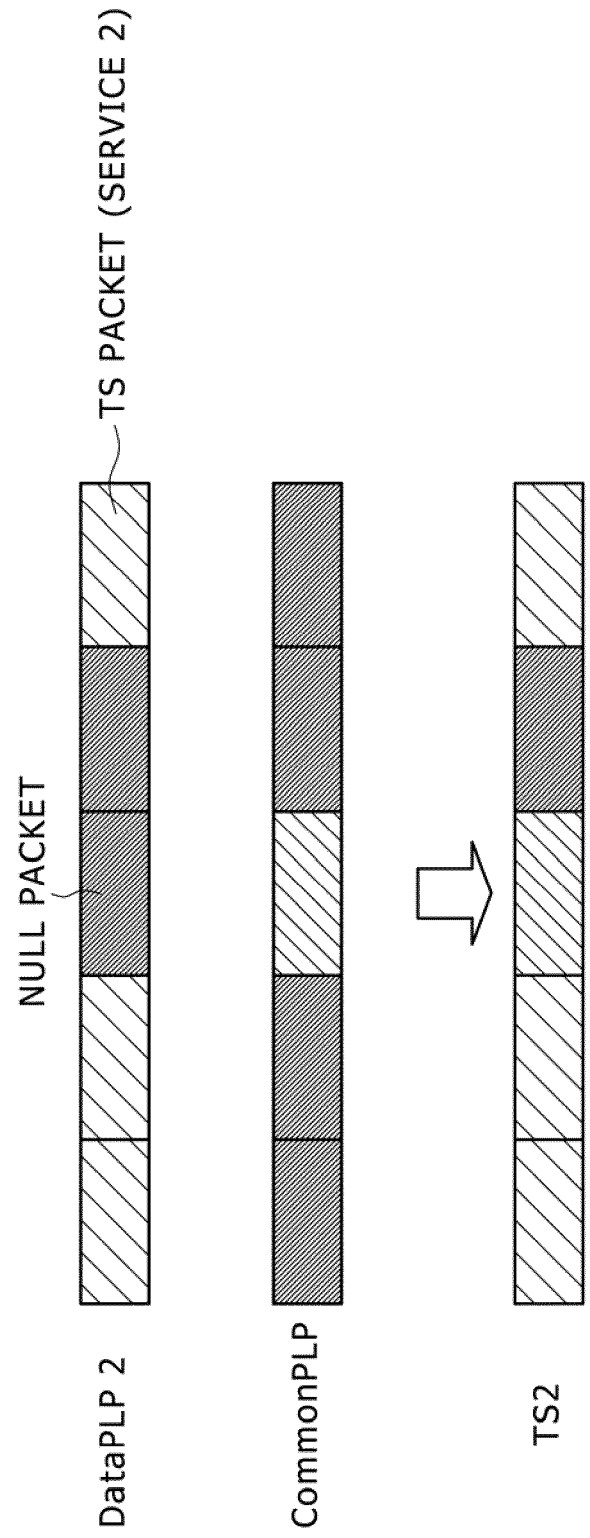
FIG. 8 is a diagrammatic view illustrating a reconstruction method of a TS on the reception side.

In particular, only the sequence Data PLP2 and the Common PLP corresponding to the sequence Data PLP2 which are individually surrounded by thick frameworks in FIG. 7 are inputted to the output I/F 23. Then, the output I/F 23 processes the sequence Data PLP2 and the Common PLP inputted thereto such that a Null packet included in the sequence Data PLP2 is replaced by the common packet included in the corresponding Common PLP. Consequently, the original TS TS2 similar to the TS TS2 illustrated in FIG. 4 is reconstructed as shown in FIG. 8.

Figure 9:
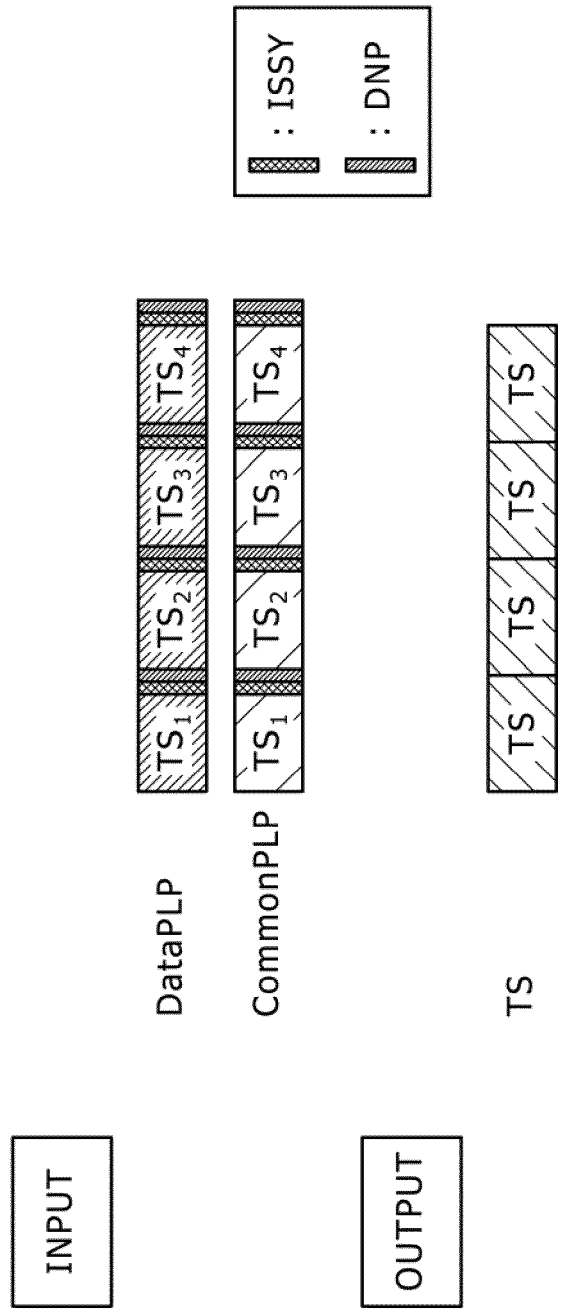
FIG. 9 is a diagrammatic view illustrating details of the reconstruction method of a TS on the reception side.

FIG. 9 illustrates details of a desired Data PLP, particularly the sequence Data PLP2, and a Common PLP inputted to the output I/F 23 and a TS outputted from the output I/F 23.

Referring to FIG. 9, the Data PLP and the Common PLP inputted to the output I/F 23 have a DNP and information called ISSY (information such as the ISCR, BUFS, TTO and so forth) added thereto in a unit of a TS packet as described hereinabove.

The output I/F 23 uses such information as just mentioned obtained from the PLPs to detect a combination of two packets synchronized with each other from within the Data PLP and the Common PLP and adjusts the timings of the Data PLP and the Common PLP to synchronize them with each other.

In particular, the readout rate calculation portion 33 in the output I/F 23 uses the DNP added to the Data PLP to reconstruct the original packet sequence from the Data PLP and reads the ISCR added to the TS packet. Consequently, the readout rate calculation portion 33 can determine the rate at which the TS is to be outputted, that is, the TS rate, from the following expression (1):

$$\text{Rate} = \frac{\text{N\_bits} \times (\text{N\_packets} + \sum DNP)}{(\text{ISCR\_b} - \text{ISCR\_a}) \times T} \quad (1)$$

where N_bits is the bit number per one packet, and, for example, 1504 (bits/packet) is substituted into N_bits. Meanwhile, T is the unit of an elementary period, and, for example, in the case of the 8 MHz band, such a value as 7/64 us is substituted into T.

FIGS. 10A and 10B illustrate an example of calculation of a TS rate executed by the readout rate calculation portion 33. It is to be noted that, in FIGS. 10A and 10B, the time advances from the left toward the right as indicated by an arrow mark on the bottom of FIG. 10B.

As seen in FIG. 10A, TS packets and DNPs and ISCRs which are added to the individual TS packets are inputted as a Data PLP to the readout rate calculation portion 33. In the case of the present example, the DNP added to the first TS packet from the right in FIG. 10A indicates 3, and the ISCR indicates 3000 [T]. Similarly, the DNP of the second TS packet indicates 0 and the ISCR indicates 1000 [T], and the DNP of the third TS packet indicates 2 and the ISCR indicates 500 [T].

If the DNPs mentioned are used to place Null packets into the original state, then the Data PLP of FIG. 10A is converted into such a stream as seen in FIG. 10B. Referring to FIG. 10B, in the stream illustrated, three Null packets denoted by NP in FIG. 10B are placed next to the first TS packet and followed by the second and third TS packets, which are in turn followed by two Null packets.

Here, if the packet rate which is a period of time per one packet is represented by $P_{ts}$, then the packet rate $P_{ts}$ is determined in accordance with the following expression (2):

$$PacketRate = \frac{ISCR\_b - ISCR\_a}{N\_packets + \sum DNP} \quad (2)$$

Accordingly, in the case of the present example, $P_{ts}=(ISCR\_b-ISCR\_a)/(N\_packets+\Sigma DNP)=(3000\ [T]-500[T])/5[packets]=500[T/packet]$.

Then, if the TS rate is represented by $R_{TS}$, then the TS rate $R_{TS}$ is determined from the expression (1) given hereinabove and the packet rate $P_{ts}$ described above in the following manner:

$R_{TS}=N\_bits/P_{ts}\times T=1504[8\ bits/packet]/500[T/packet]\times 7/64\ [us]=27.5\ [Mbps]$ The packet rate $P_{ts}$ (=500 [T/packet]) and the TS rate $R_{TS}$ (=27.5 [Mbps]) calculated in this manner are supplied to the readout control portion 34.

Now, details of operation of the write control portion 32 and the readout control portion 34 into and from the buffer 31 are described with reference to FIG. 11.

Figure 11:
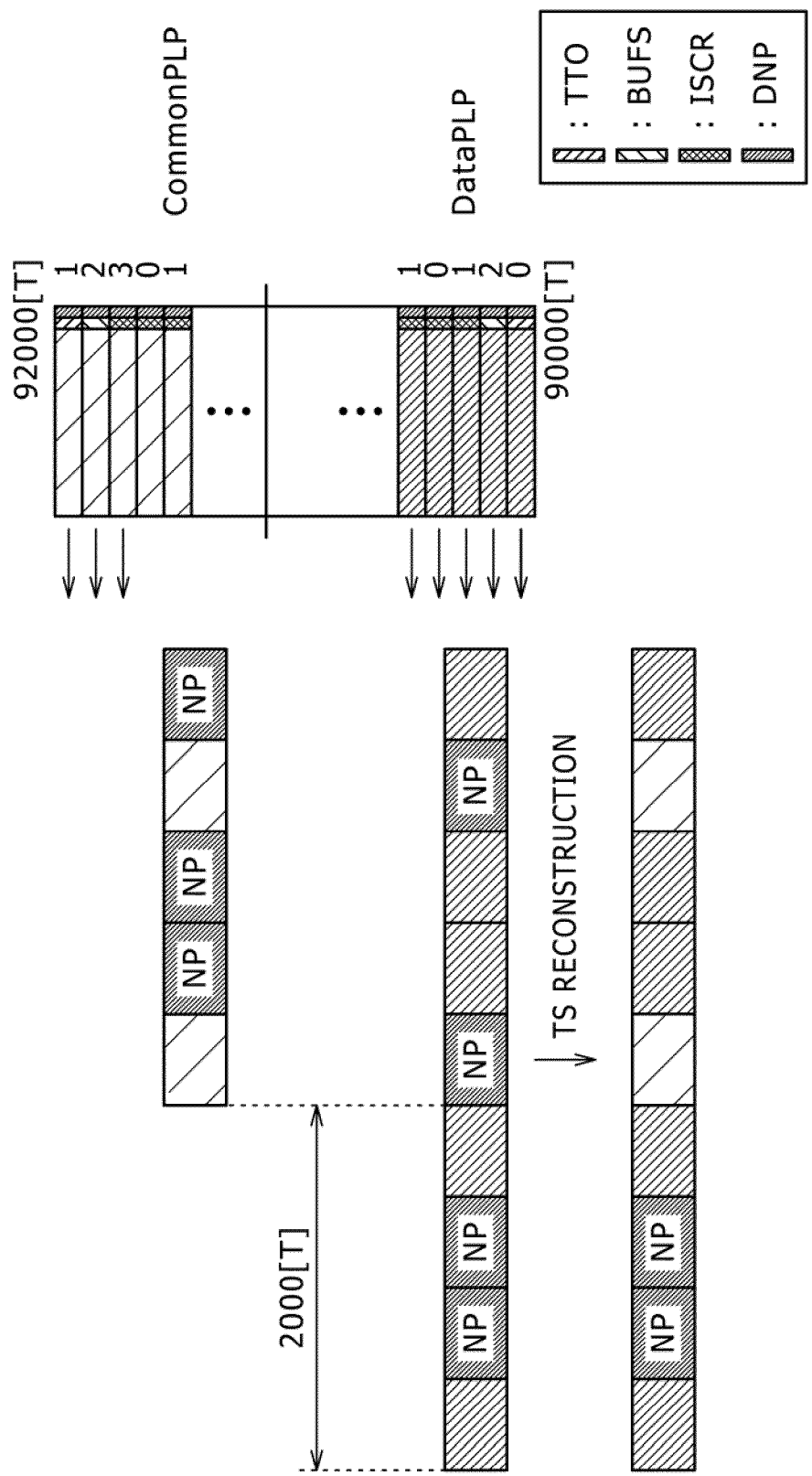
FIG. 11 is a diagrammatic view illustrating writing and readout timings of a buffer.

FIG. 11 illustrates timings of writing into and reading out from the buffer 31.

In the example of FIG. 11, a manner in which PLPs are successively accumulated into the buffer 31 is illustrated schematically. In this schematic view, a manner in which Common PLPs are successively accumulated from above to below in FIG. 11 is illustrated in an upper side region of FIG. 11 while a manner in which Data PLPs are successively accumulated from below to above in FIG. 11 is illustrated in a lower side region of FIG. 11.

In particular, in the example of FIG. 11, Common PLPs inputted to the output I/F 23 are successively stored into the buffer 31 under the control of the write control portion 32 such that five common packets (TS packets) illustrated in FIG. 11 are stored into a predetermined region on the upper side in FIG. 11 together with the ISSYs and the DNPs added thereto. As regards the ISSYs and the DNPs added to the common packets, in the example illustrated in FIG. 11, TTO=92000 [T] and DNP=1 are placed in the first common packet while BUFS and DNP=2 are placed in the second common packet. Further, in the third to fifth common packets, the DNP=3, 0, 1 are placed together with the ISCR, respectively.

Meanwhile, the inputted Data PLPs are successively stored into the buffer 31 under the control of the write control portion 32 such that five TS packets illustrated in FIG. 11 are stored into a predetermined region on the lower side in FIG. 11 together with the ISSYs and the DNPs added thereto. As regards the ISSYs and the DNPs added to the TS packets, TTO=90000 [T] and DNP=0 are placed in the first TS packet while BUFS and DNP=2 are placed in the second common packet. Meanwhile, in the third to fifth TS packets, DNP=1, 0, 1 are placed together with the ISCRs. It is to be noted that, while no particular value is described for BUFS and ISCR in the example of FIG. 11, actually predetermined values are allocated to the ISSYs similarly to the TTOs.

The Common PLPs and the Data PLPs are stored in such a manner as described above into the buffer 31. Then, the Common PLPs and the Data PLPs stored in the buffer 31 are read out under the control of the readout control portion 34. In the case of the example of FIG. 11, the TS packet at the top of the Data PLPs is read out later by 90000 [T] than the top of the P1 symbol using the value of the TTO, and the common packet at the top of the Common PLPs is read out later by 92000 [T] than the top of the P1 symbol, that is, after lapse of 2000 [T] after the TS packet at the top of the Data PLPs is read out.

In particular, while the readout control portion 34 reads out both of the Common PLPs and the Data PLPs from the buffer 31, it adjusts the output timings of the Common PLPs and the Data PLPs using the difference $TTO_{diff}$. Then, if the readout control portion 34 detects a combination of a Common PLP and a Data PLP whose readout timings are synchronized with each other from the read out PLPs, then it replaces a Null packet placed in the Data PLP with the common packet of the Common PLP to reconstruct the original TS.

Synchronization which uses a TTO ($TTO_{diff}$) which indicates a readout timing of a packet, that is, TTO synchronization, is carried out to reconstruct a TS in such a manner as described above. However, if a wrong signal is received from a cause of a reception channel environment or the like, then the synchronism between Common PLPs and Data PLPs is lost, resulting in the necessity for re-establishment of synchronism as described hereinabove. Thus, means for eliminating out-of-synchronism to re-establish synchronism, particularly the TTO information retainer 51 and the address corrector 52 shown in FIG. 3, are described with reference to FIGS. 12 and 13.

Figure 12:
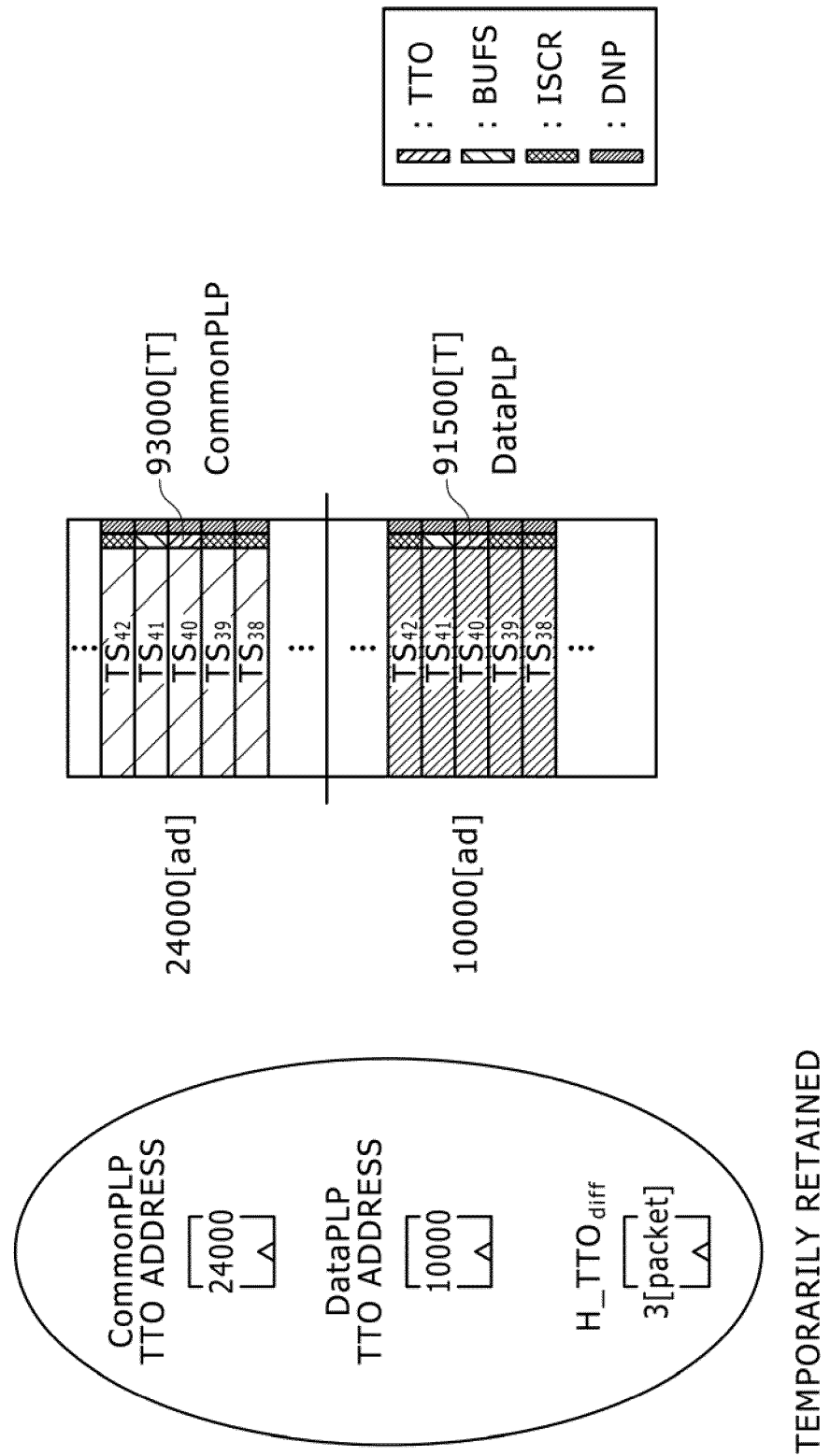
FIG. 12 is a diagrammatic view illustrating retention of TTO information.

FIG. 12 illustrates retention of TTO information upon writing of TS packets.

Particularly, FIG. 12 schematically illustrates a manner in which PLPs are successively accumulated into the buffer 31. In the example of FIG. 12, TS packets . . . , $TS_{38}$, $TS_{39}$, $TS_{40}$, $TS_{41}$, $TS_{42}$, of Common PLPs are stored together with ISSys and DNPs added thereto in a predetermined region of the buffer 31 as seen in a region on the upper side in FIG. 12. Similarly, TS packets . . . , $TS_{38}$, $TS_{39}$, $TS_{40}$, $TS_{41}$, $TS_{42}$, of Data PLPs are stored in another predetermined region of the buffer 31 as seen in a region on the lower side in FIG. 12.

Further, upon storage of the TS packets, the TTO addresses and the differences $H\_TTO_{diff}$ described hereinabove are retained into the TTO information retainer 51.

In the example of FIG. 12, 24000 [ad] which is write address of the TS packet $TS_{40}$ to which the TTO is added from among the TS packets of the Common PLPs accumulated in the buffer 31 and 10000 [ad] which is a write address of the TS packet $TS_{40}$ to which the TTO is added from among the TS packets of the Data PLPs are retained as TTO addresses. Further, as the difference between the TTOs added to the TS packets of the PLPs, $H\_TTO_{diff}=93000\ [T]-91500\ [T]=1500\ [T]$ is determined.

Here, it can be considered that the difference $H\_TTO_{diff}$ represents by what number of packets the Common PLP and the Data PLP to which the TTO is added are displaced from each other in time. For example, where the packet rate $P_{ts}$ which is a period of time per one packet is 500 [T/packet], $H\_TTO_{diff}=1500\ [T]/500\ [T/packet]=3\ [packets]$. In other words, it is scheduled that the TS packet (24000 [ad]) of the Common PLP is read out later by three packets than the TS packet (10000 [ad]) of the Data PLP.

In this manner, as the TTO information, $H\_TTO_{diff}=3$ [packets] is retained into the TTO information retainer 51 together with the TTO address of the Common PLP=24000 [ad] and the TTP address of the Data PLP=10000 [ad].

Figure 13:
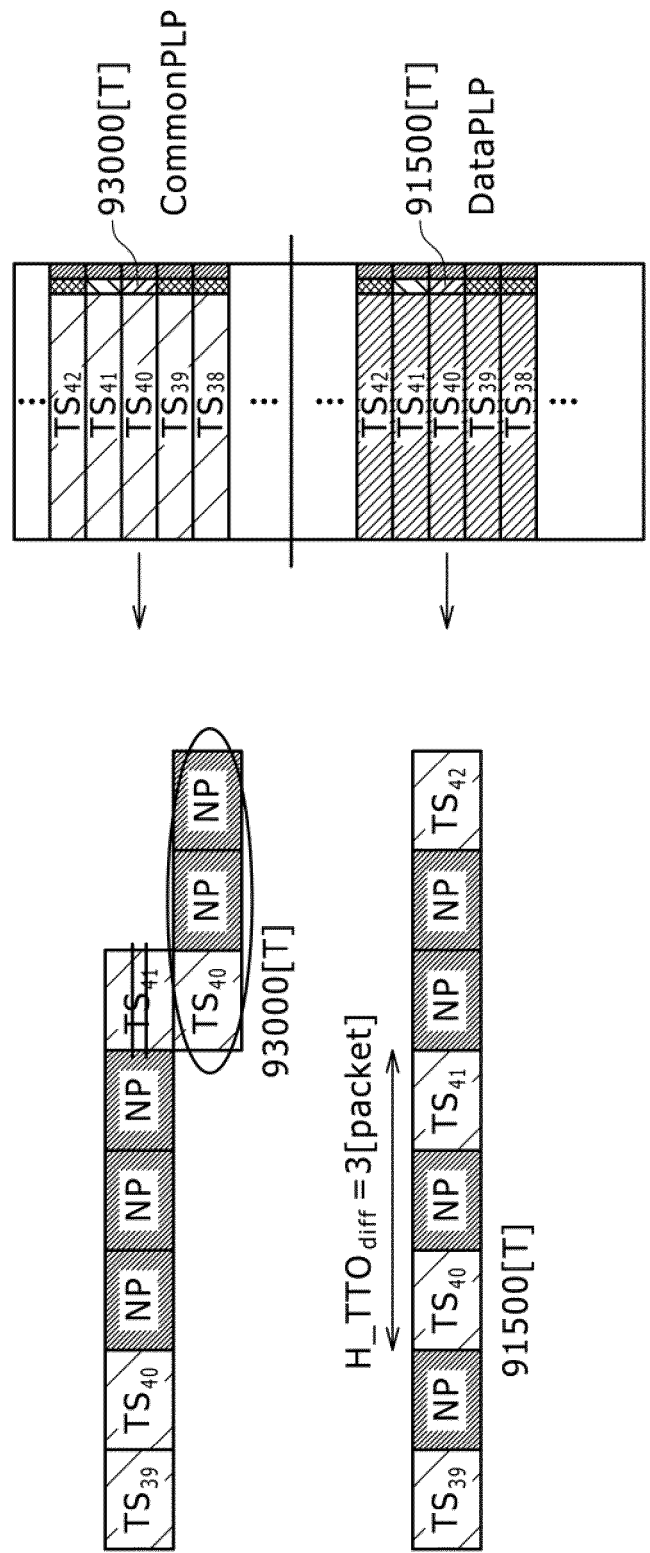
FIG. 13 is a diagrammatic view illustrating correction of an address using TTO information.

FIG. 13 illustrates correction of an address using TTO information upon reading out of a TS packet. It is to be noted that, in FIG. 13, the direction of time is a direction from the left toward the right.

Referring to FIG. 13, after readout of the TS packets of the Data PLPs accumulated in the buffer 31 is started, when the read address comes to 10000 [ad], that is, when the read address becomes equal to that of the TS packet $TS_{40}$, it becomes coincident with the TTO address of the Data PLP=10000 [ad]. In this instance, when the read address advances by three packets ($H\_TTO_{diff}$=3 [packets]) from the TTO address of the Data PLP=10000 [ad], the read address in which the TTO address of the Common PLP=24000 [ad], that is, the TS packet $TS_{40}$ of the Common PLP is stored, will be read out.

However, if TTO synchronism is lost as seen in FIG. 13, then even if the read address of the Data PLP advances by three packets from the TTO address=10000 [ad], the read address of the Common PLP does not become equal to the TTO address=24000 [ad]. In the case of the example of FIG. 13, the TTO address of the Common PLP=24000 [ad], that is, the address of the TS $TS_{40}$, is read out earlier than the scheduled one at 91000 [T].

In this instance, the address corrector 52 corrects the address so that the TS $TS_{40}$ is read out compulsorily in such a manner that the TTO address (24000 [ad]) of a Common Address is read out in place of the TS $TS_{41}$ of the Common PLP read out later by three packets after the TTO address (10000 [ad]) of the Data PLP is read out, that is, in such a manner that rewinding is carried out.

Consequently, the Common TTO address (24000 [ad]) is read out again later by three packets after the Data TTO address (10000 [ad]) is read out. Then, after the TS packet read out with the address replaced, TTO synchronism can be established again.

In the case where, upon writing of TS packets, TTO information obtained from TTOs added to the TS packets is retained and, upon readout of the TS packets, when TTO synchronism is lost, the retained TTO information is used to correct the read address, thereby re-establishing synchronism.

In particular, although a TTO added to a TS packet is basically placed only at the top of a T2 frame and the rate at which the TTO is included as an ISSY is not high, when the read address is corrected to re-establish synchronism, if the TTO is used, then even if the read address advances by a great amount or the read address delays by a great amount, only by replacing the read address, the read address is immediately corrected to a correct read address which is not in an out-of-synchronism state. As a result, re-establishment of synchronism can be carried out rapidly.

Re-Synchronization Process

Now, a re-synchronization process executed by the write control portion 32 and the readout control portion 34 is described with reference to a flow chart of FIG. 14.

Figure 14:
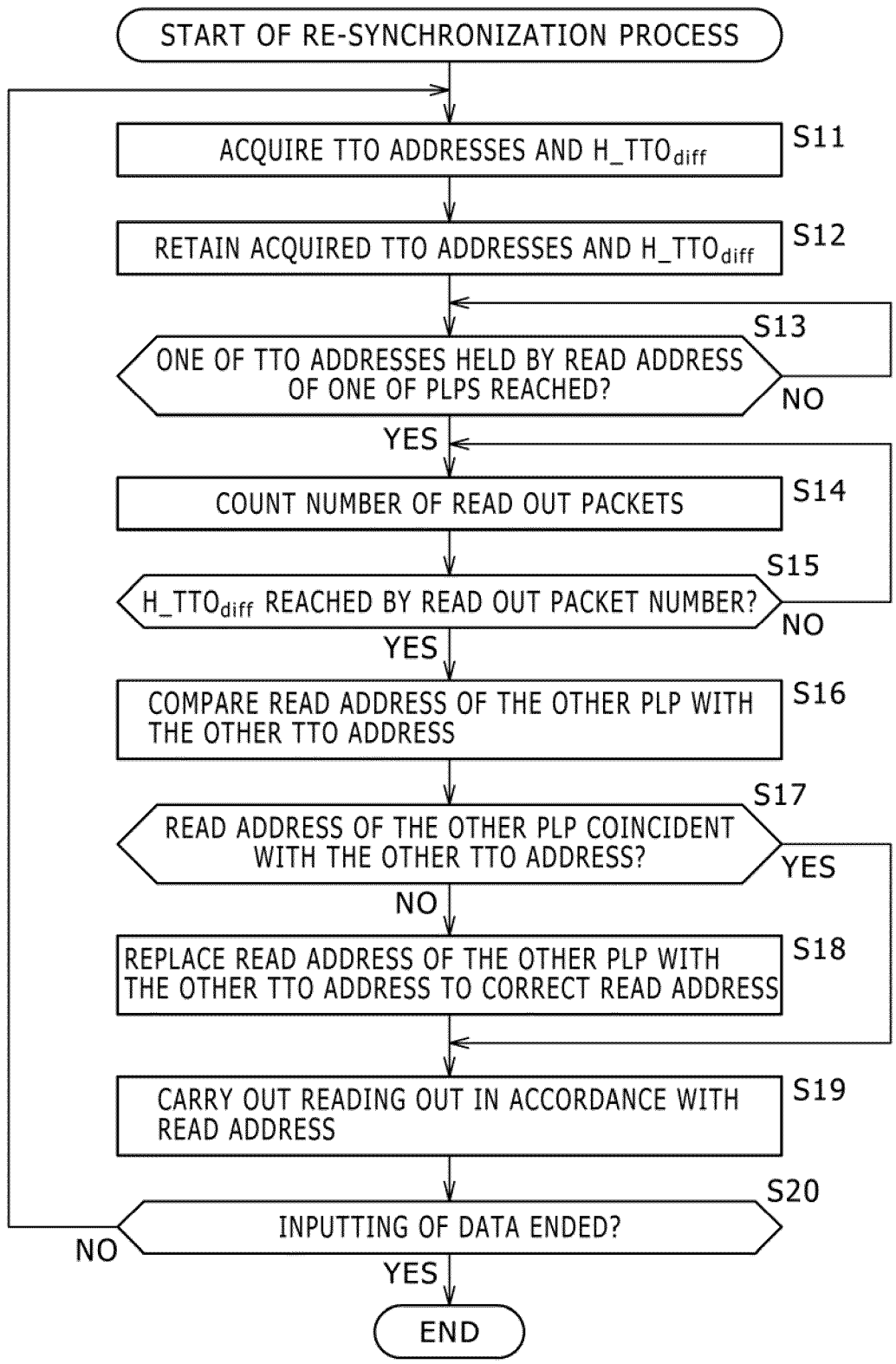
FIG. 14 is a flow chart illustrating a re-synchronization process.

It is to be noted that, while, in the description given with reference to FIG. 14, the terms "one PLP" and "the other PLP" and the terms "one TTO address" and "the other TTO address" are used, the use of the terms is intended that whichever ones of a Common PLP and a Data PLP may individually be applied as "one PLP address" and "the other PLP address" and whichever ones of PLP and TTO address may individually be applied as "one TTO address" and "the other TTO address."

In particular, if a Common PLP is "one PLP," then a Data PLP is "the other PLP." In this instance, "one TTO address" is the TTO address of a Common PLP which is the one PLP, and "the other TTO address" is the TTO address of the Data PLP which is the other PLP. On the other hand, if a Data PLP is "one PLP," then a Common PLP is "the other PLP." In this instance, "one TTO address" is the TTO address of the Data PLP which is the one PLP, and "the other TTO address" is the TTO address of the Common PLP which is the other PLP.

In the buffer 31, PLPs supplied from the error correction block 22 under the writing control of the write control portion 32 are accumulated. At step S11, the write control portion 32 acquires TTO addresses and a difference $H\_TTO_{diff}$ of a combination of a Common PLP and a Data PLP which are in TTO synchronism with each other upon writing of a TS packet into the buffer 31.

At step S12, the TTO information retainer 51 retains the TTO addresses and the difference $H\_TTO_{diff}$, that is, TTO information, acquired by the write control portion 32.

At step S13, the address corrector 52 discriminates whether or not the read address of the one PLP reaches the one TTO address retained in the TTO information retainer 51.

If it is decided at step S13 that the two addresses coincide with each other and hence the read address of the one PLP reaches the one TTO address, then the address corrector 52 starts counting of the number of read out packets at step S14.

The address corrector 52 repeats reading out of a TS packet thereby to successively count up the number of read out packets at step S14 until the number of read out packets reaches the difference $H\_TTO_{diff}$ retained in the TTO information retainer 51 and a discrimination "Yes" is made at step S15.

Then, when the number of read out packets coincides with the difference $H\_TTO_{diff}$ and the discrimination "Yes" is made at step S15, the address corrector 52 compares the read address of the other PLP and the other TTO address retained in the TTO information retainer 51 with each other at step S16 and then discriminates whether or not the two addresses coincide with each other at step S17.

If it is discriminated at step S17 that the read address of the other PLP and the other TTO address do not coincide with each other, then the address corrector 52 replaces the read address of the other PLP with the other TTO address to correct the read address at step S18. Then, the readout control portion 34 reads out the TS packet of the other PLP accumulated in the buffer 31 in accordance with the read address replaced with the TTO address at step S19.

On the other hand, if it is discriminated at step S17 that the read address of the other PLP and the other TTO address coincide with each other, then since the timing at which the TTO of the PLP is not displaced and TTO synchronism is maintained, the processing skips step S18 and advances directly to step S19. In this instance, at step S19, the readout control portion 34 reads out the TS packet of the other PLP accumulated in the buffer 31 in accordance with the read address not replaced with the TTO address.

Then, after reading out of the TS packet in accordance with the read address is carried out at step S19, if inputting of data is not completed as yet and the discrimination at step S20 is "No," then the process returns to step S11 to repeat the processes described above.

On the other hand, if it is discriminated at step S20 that inputting of data to the buffer 31 is ended, then the re-synchronization process of FIG. 14 is ended.

As described above, in the readout control portion 34, TTO information of TTO addresses and differences $H\_TTO_{diff}$ are retained by the TTO information retainer 51 and the address corrector 52 carries out, if the read address of the other PLP and the TTO address do not coincide with each other after lapse of the difference $H\_TTO_{diff}$ after the read address of one PLP and the TTO address coincide with each other, correction of replacing the read address of the other PLP with the TTO address. Consequently, even where the read timing of a TS packet is displaced between a Common PLP and a Data PLP, the timings of them can be returned to correct timings to re-establish synchronism rapidly.

Example of the Configuration of the Reception System

Now, a configuration of the reception system is described with reference to FIGS. 15 to 17.

Figure 15:
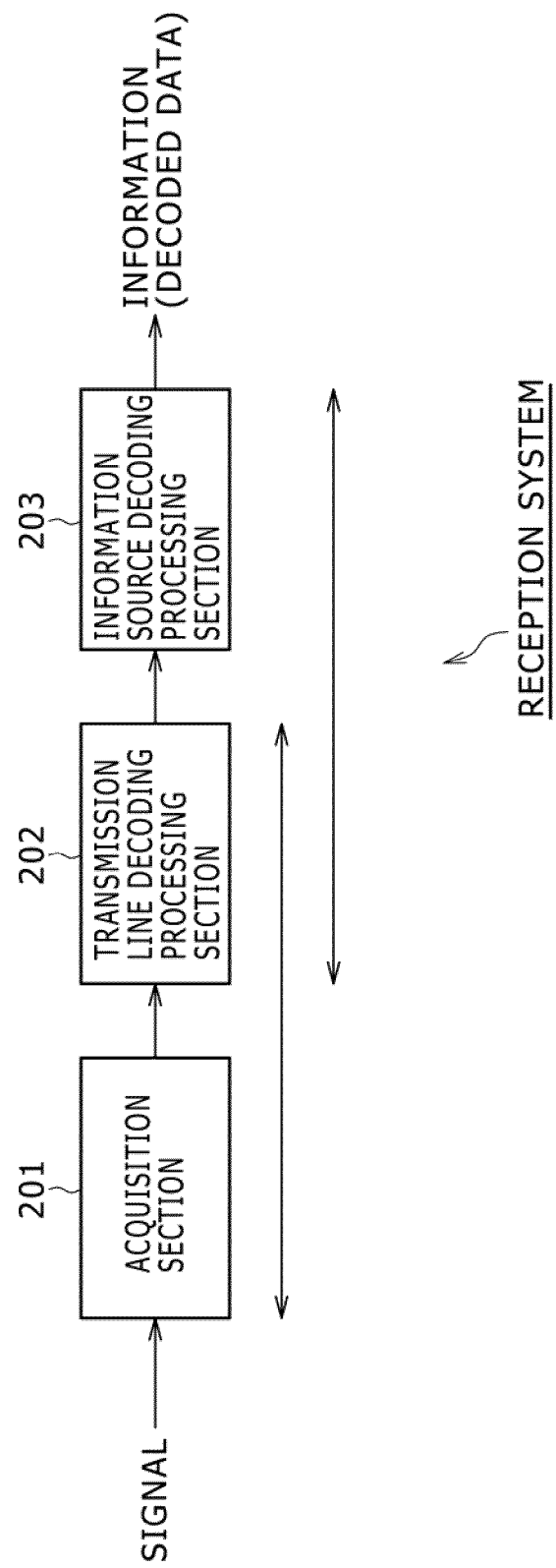
FIGS. 15, 16 and 17 are block diagrams showing different reception systems to which the present invention is applied.

FIG. 15 shows an example of a configuration of a first mode of a reception system to which the present invention is applied.

Referring to FIG. 15, the reception system includes an acquisition section 201, a transmission line decoding processing section 202 and an information source decoding processing section 203.

The acquisition section 201 acquires an OFDM signal of the M-PLP system of DVB-T2 through a transmission line such as, for example, terrestrial digital broadcasting, satellite broadcasting, a CATV (Cable Television) network, the Internet or some other network not shown. The acquisition section 201 supplies the acquired OFDM signal to the transmission line decoding processing section 202.

If the OFDM signal is broadcast, for example, from a broadcasting station through a ground wave, a satellite wave, a CATV network or the like, then the acquisition section 201 is configured from a tuner, an STB or the like similarly to the acquisition section 12 shown in FIG. 2. On the other hand, if the OFDM signal is transmitted, for example, from a WEB server by multicast as in the case of IPTV (Internet Protocol Television), the acquisition section 201 is configured from a network I/F such as, for example, an NIC (Network Interface Card).

If the OFDM signal is broadcast, for example, from a broadcasting station through a ground wave, a satellite wave, a CATV network or the like, then, for example, a plurality of OFDM signals transmitted from a plurality of transmission apparatus through a plurality of transmission lines are received by the acquisition section 201. As a result, the plural OFDM signals are received as a combined single OFDM signal.

The transmission line decoding processing section 202 carries out a transmission line decoding process including at least a process of decoding PLPs from an OFDM signal acquired by the acquisition section 201 through a transmission line. Then, the transmission line decoding processing section 202 supplies a signal obtained by the transmission line decoding process to the information source decoding processing section 203.

In particular, since an OFDM signal by the M-PLP system is defined by a plurality of Data PLPs configured from packets which remain when a packet common to all of a plurality of TSs is extracted from each of the TSs and a Common PLP configured from the common packet, the transmission line decoding processing section 202 carries out, for example, a process of decoding PLPs (packet sequence) for the OFDM signal and outputs a resulting signal.

Further, the OFDM signal acquired by the acquisition section 201 through a transmission line is in a state distorted by an influence of a transmission line characteristic, and the transmission line decoding processing section 202 carries out a decoding process including, for example, transmission line estimation, channel estimation, phase estimation and so forth for such OFDM signal.

Further, the transmission line decoding process includes a process of correcting errors caused by the transmission line and so forth. For example, as error correction coding, LDPC code, Reed Solomon coding and so forth are available.

The information source decoding processing section 203 carries out an information source decoding process including at least a process of decompressing compressed information into original information for the signal for which the transmission line decoding process has been carried out.

In particular, the OFDM signal acquired by the acquisition section 201 through a transmission line is sometimes in a state in which compression coding for compressing information in order to reduce the data amount of images, sound and so forth as information is applied. In this instance, the information source decoding processing section 203 carries out an information source decoding process such as a process of decompressing the compressed information into original information and so forth for the signal to which the transmission line decoding process has been carried out.

It is to be noted that, if the OFDM signal acquired by the acquisition section 201 through the transmission line is not in a compression coded form, then the information source decoding processing section 203 does not carry out the process of decompressing compressed information into original information.

Here, the decompression process may be, for example, MPEG decoding. Further, the transmission line decoding process sometimes includes descrambling and so forth in addition to the decompression process.

In the reception system configured in such a manner as described above, the acquisition section 201 acquires, through the transmission line, an OFDM signal according to the M-PLP system obtained by applying compression coding such as MPEG coding and further applying error correction coding for data, for example, of an image and sound. The acquisition section 201 supplies the acquired OFDM signal to the transmission line decoding processing section 202. It is to be noted that, at this time, the OFDM signal is acquired in a state distorted by an influence of a transmission line characteristic.

The transmission line decoding processing section 202 carries out a process similar to that of the transmission line decoding processing section 13 shown in FIG. 2 as a transmission line decoding process for the OFDM signal from the acquisition section 201. The transmission line decoding processing section 202 supplies a signal obtained as a result of the transmission line decoding process to the information source decoding processing section 203.

The information source decoding processing section 203 carries out a process similar to that of the decoder 14 shown in FIG. 2 as an information source decoding process for the signal from the transmission line decoding processing section 202. The information source decoding processing section 203 outputs an image or sound obtained as a result of the information source decoding process.

Such a reception system of FIG. 15 as described above can be applied, for example, to a television tuner or the like which receives television broadcasting as digital broadcasting.

It is to be noted that the acquisition section 201, transmission line decoding processing section 202 and information source decoding processing section 203 can each be configured as a single independent apparatus or hardware apparatus such as an IC (Integrated Circuit) or a software module.

Further, the acquisition section 201, transmission line decoding processing section 202 and information source decoding processing section 203 can be configured in different manners. For example, a set of the acquisition section 201 and the transmission line decoding processing section 202, a set of the transmission line decoding processing section 202 and the information source decoding processing section 203 or a set of the acquisition section 201, the transmission line decoding processing section 202, and information source decoding processing section 203 can be configured as a single independent apparatus.

Figure 16:
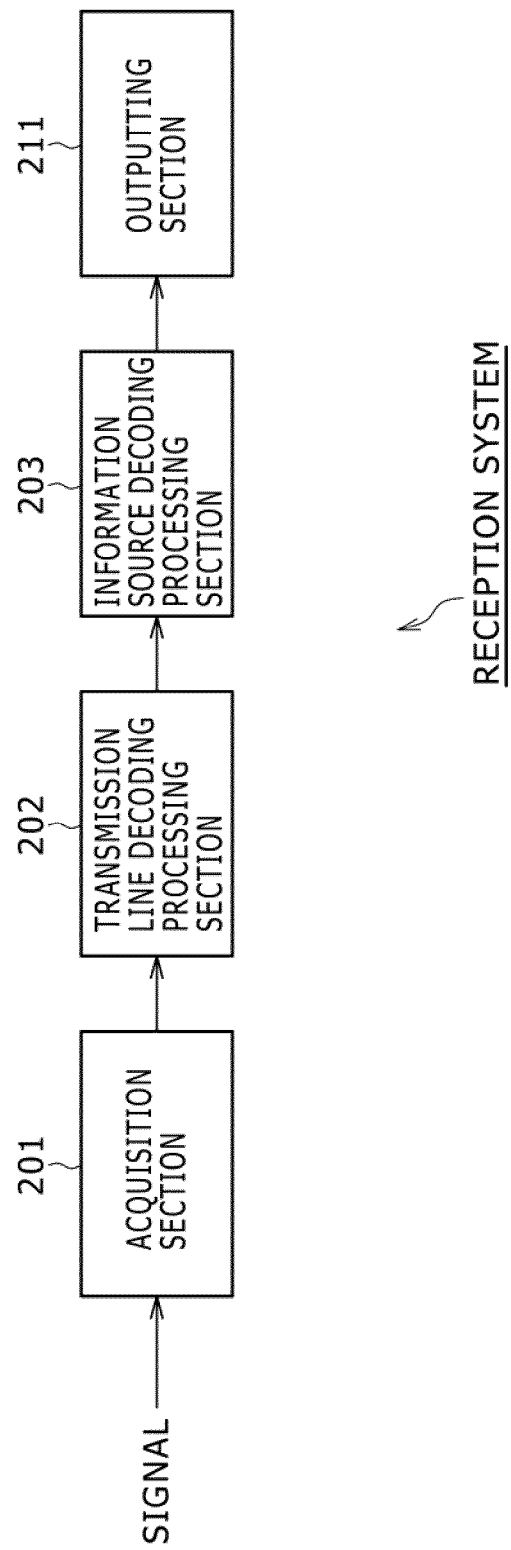

FIG. 16 shows an example of a configuration of a second mode of the reception system to which the present invention is applied.

The reception system shown in FIG. 16 includes common components to those of the reception system described hereinabove with reference to FIG. 15, and overlapping description of the common components is omitted herein to avoid redundancy.

Referring to FIG. 16, the reception system shown is common to the reception system described hereinabove with reference to FIG. 15 in that it includes an acquisition section 201, a transmission line decoding processing section 202 and an information source decoding processing section 203 but is different from the reception system of FIG. 15 in that it additionally includes an outputting section 211.

The outputting section 211 may be, for example, a display apparatus for displaying an image and/or a speaker for outputting sound, and outputs an image, sound or the like as a signal outputted from the information source decoding processing section 203. In other words, the outputting section 211 displays an image and/or outputs sound.

Such a reception system of FIG. 16 as described above can be applied, for example, to a television set for receiving television broadcasting as digital broadcasting, a radio receiver for receiving radio broadcasting and so forth.

It is to be noted that, if the OFDM signal acquired by the acquisition section 201 is not in a compression coded state, then a signal outputted from the transmission line decoding processing section 202 is supplied to the outputting section 211.

Figure 17:
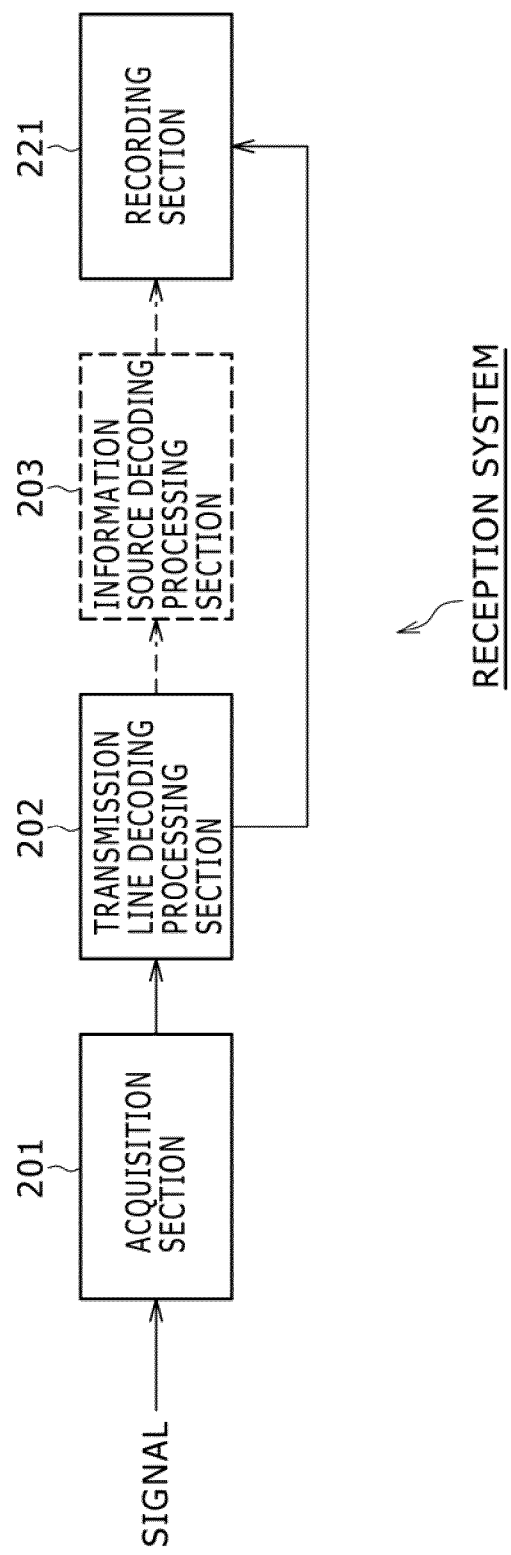

FIG. 17 shows an example of a configuration of a third mode of the reception system to which the present invention is applied.

The reception system shown in FIG. 17 includes common components to those of the reception system described hereinabove with reference to FIG. 15, and overlapping description of the common components is omitted herein to avoid redundancy.

Referring to FIG. 17, the reception system shown is similar to that of FIG. 15 in that it includes an acquisition section 201 and a transmission line decoding processing section 202.

It is to be noted, however, that the reception system of FIG. 17 is different from that of FIG. 15 in that it does not include the information source decoding processing section 203 but includes a recording section 221.

The recording section 221 records a signal outputted from the transmission line decoding processing section 202, for example, a TS packet of a TS of MPEG, in a recording (storage) medium such as an optical disk, a hard disk (magnetic disk) or a flash memory.

The reception system of FIG. 17 having such a configuration as described above can be applied to a recorder for recording a television broadcast or the like.

It is to be noted that the reception system of FIG. 17 may additionally include the information source decoding processing section 203 such that a signal after an information source decoding process is applied by the information source decoding processing section 203, that is, an image or sound obtained by decoding, can be recorded by the recording section 221.

Computer to which the Invention is Described

Incidentally, while the series of processes described above can be executed by hardware, it may otherwise be executed by software. Where the series of processes is executed by software, a program which constructs the software is installed into a computer. The computer in this instance includes a computer incorporated in hardware for exclusive use, a personal computer for universal use which can execute various functions by installing various programs, and so forth.

Figure 18:
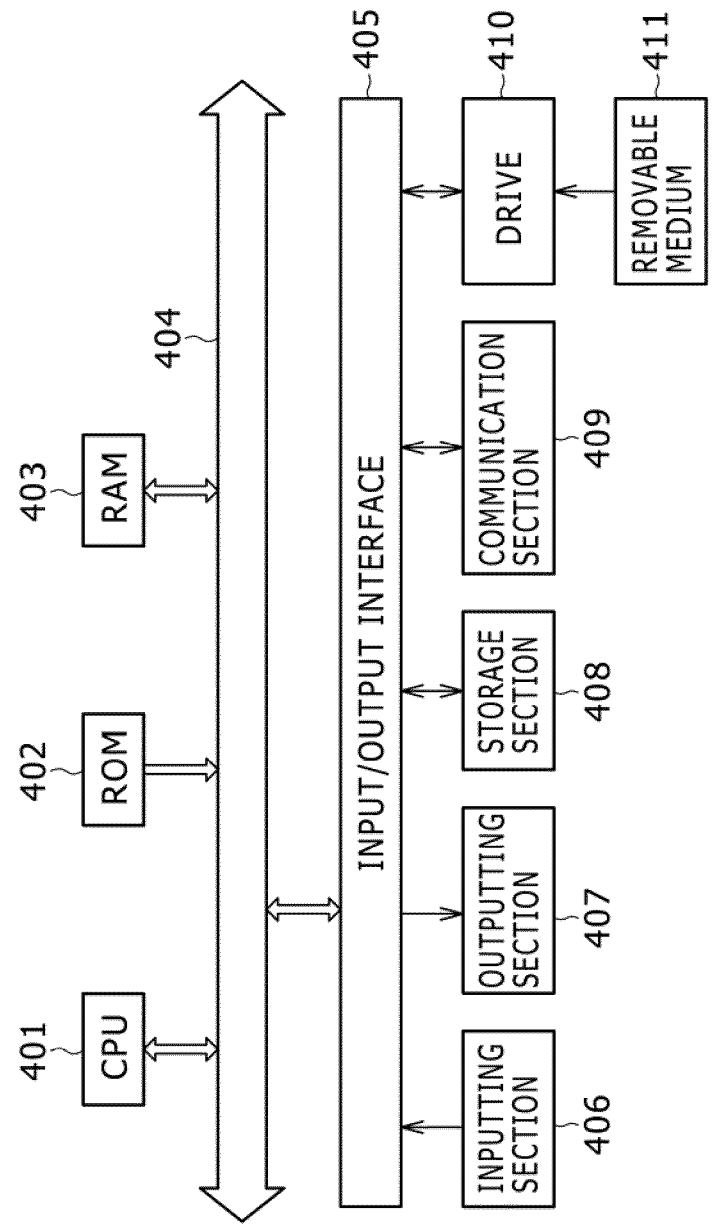
FIG. 18 is a block diagram showing an example of a hardware configuration of a computer.

FIG. 18 shows an example of a hardware configuration of a computer which executes the series of processes described hereinabove in accordance with a program.

Referring to FIG. 18, in the computer shown, a central processing unit (CPU) 401, a read only memory (ROM) 402 and a random access memory (RAM) 403 are connected to one another by a bus 404.

Further, an input/output interface 405 is connected to the bus 404. An inputting section 406, an outputting section 407, a storage section 408 and a communication section 409 and a drive 410 are connected to the input/output interface 405.

The inputting section 406 includes a keyboard, a mouse, a microphone and so forth. The outputting section 407 includes a display unit, a speaker and so forth. The storage section 408 includes a hard disk, a nonvolatile memory or the like. The communication section 409 includes a network interface or the like. The drive 410 drives a removable medium 411 such as a magnetic disk, an optical disk, a magneto-optical disk or a semiconductor memory.

In the computer configured in such a manner as described above, the CPU 401 loads a program stored, for example, in the storage section 408 into the RAM 403 through the input/output interface 405 and the bus 404 and executes the program to carry out the series of processes described above.

The program to be executed by the computer, particularly by the CPU 401, can be recorded on and provided as a removable medium 411, for example, as a package medium or the like. Further, the program can be provided through a wire or wireless transmission medium such as a local area network, the Internet or a digital broadcast.

In the computer, the program can be installed into the storage section 408 through the input/output interface 405 by loading the removable medium 411 into the drive 410. Further, the program can be received by the communication section 409 through a wire or wireless transmission medium and installed into the storage section 408. Or, the program may be installed in advance in the ROM 402 or the storage section 408.

It is to be noted that, in the present specification, the steps which describe the program recorded in or on a recording medium may be but need not necessarily be processed in a time series in the order as described, and include processes which are executed in parallel or individually without being processed in a time series.

Further, in the present specification, the term "system" is used to represent an entire apparatus composed of a plurality of devices or apparatus.

While preferred embodiments of the present invention have been described using specific terms, such description is for illustrative purpose only, and it is to be understood that changes and variations may be made without departing from the spirit or scope of the following claims.

The present application contains subject matter related to that disclosed in Japanese Priority Patent Application JP 2010-000918 filed in the Japan Patent Office on Jan. 6, 2010, the entire content of which is hereby incorporated by reference.

What is claimed is:

1. A reception apparatus, comprising:
a receiver configured to receive an OFDM (orthogonal frequency division multiplexed) signal generated by modulating a common packet sequence configured from a packet common to a plurality of streams and a data packet sequence configured from a plurality of packets individually unique to the plural streams;
a buffer configured to accumulate packets of the common packet sequence and the data packet sequence obtained by demodulating the received OFDM signal;
a memory configured to retain correction information for correcting out-of-synchronism between the common packet sequence and the data packet sequence obtained from particular packets of the common packet sequence and the data packet sequence upon reading out of the packets accumulated in said buffer, the correction information including a difference value of TTOs (Time to Output) added to the particular packets of the common packet sequence and the data packet sequence which are in synchronism with each other depending upon the TTOs; and
correction circuitry configured to correct the out-of-synchronism of the packet which suffers from the out-of-synchronism of the packets based on the correction information retained in said memory.

2. The reception apparatus according to claim 1, wherein the correction information includes addresses of said buffer when the packets of the common packet sequence and the data packet sequence which are in synchronism with each other are written into said buffer and the difference value that indicates a difference between readout timings of the packets of the packet sequences, and,
upon reading out of the packets accumulated in said buffer, if, when time of the difference information elapses after one of the read addresses reaches one of the addresses retained in said memory, the other read address of said buffer does not coincide with the other address retained in said memory, then the other read address of said buffer is replaced with the other address retained in said memory to correct the read address of said buffer with regard to the packet which suffers from the out-of-synchronism.

3. The reception apparatus according to claim 2, wherein the common packet sequence and the data packet sequence are Common PLPs and Data PLPs, respectively, produced from a plurality of streams in accordance with the M-PLP (Multiple PLP (Physical Layer Pipe)) system of DVB-T (Digital Video Broadcasting-Terrestrial)2.

4. The reception apparatus according to claim 3, wherein the addresses included in the correction information are addresses when the Common PLP and the Data PLP which are in synchronism with each other depending upon the TTO which is added to each of the particular packets and indicates a timing of reading out of the packet are written into said buffer.

5. The reception apparatus according to claim 4, wherein the difference value is a number of packets corresponding to the difference between the TTOs.

6. A reception method for a reception apparatus which includes a buffer, comprising the steps of:
receiving, by a receiver of the reception apparatus, an OFDM signal generated by modulating a common packet sequence configured from a packet common to a plurality of streams and a data packet sequence configured from a plurality of packets individually unique to the plural streams;
controlling, by circuitry of the reception apparatus when packets of the common packet sequence and the data packet sequence obtained by demodulating the received OFDM signal and accumulated in the buffer are read out, retention of correction information for correcting out-of-synchronism between the common packet sequence and the data packet sequence obtained from particular packets of the common packet sequence and the data packet sequence, the correction information including a difference value of TTOs (Time to Output) added to the particular packets of the common packet sequence and the data packet sequence which are in synchronism with each other depending upon the TTOs; and
correcting, by the circuitry, the out-of-synchronism of the packet which suffers from the out-of-synchronism of the packets based on the retained correction information.

7. A non-transitory computer-readable storage medium storing a program which when executed by a computer causes the computer to perform a method of an apparatus which includes a buffer, comprising the steps of:
receiving an OFDM signal generated by modulating a common packet sequence configured from a packet common to a plurality of streams and a data packet sequence configured from a plurality of packets individually unique to the plural streams;
controlling, when packets of the common packet sequence and the data packet sequence obtained by demodulating the received OFDM signal and accumulated in the buffer are read out, retention of correction information for correcting out-of-synchronism between the common packet sequence and the data packet sequence obtained from particular packets of the common packet sequence and the data packet sequence, the correction information including a difference value of TTOs (Time to Output) added to the particular packets of the common packet sequence and the data packet sequence which are in synchronism with each other depending upon the TTOs; and
correcting the out-of-synchronism of the packet which suffers from the out-of-synchronism of the packets based on the retained correction information.

8. A reception system, comprising:
a receiver configured to acquire, through a transmission line, an OFDM signal generated by modulating a common packet sequence configured from a packet common to a plurality of streams and a data packet sequence configured from a plurality of packets individually unique to the plural streams; and
a transmission line decoding processing section configured to carry out a transmission line decoding process including at least a decoding process of the packet streams for the signal acquired through the transmission line;
said transmission line decoding processing section including
a buffer configured to accumulate packets of the common packet sequence and the data packet sequence obtained by demodulating the OFDM signal acquired through the transmission line,
a memory configured to retain correction information for correcting out-of-synchronism between the common packet sequence and the data packet sequence obtained from particular packets of the common packet sequence and the data packet sequence upon reading out of the packets accumulated in said buffer, the correction information including a difference value of TTOs (Time to Output) added to the particular packets of the common packet sequence and the data packet sequence which are in synchronism with each other depending upon the TTOs, and correction circuitry configured to correct the out-of-synchronism of the packet which suffers from the out-of-synchronism of the packets based on the correction information retained in said memory.

9. A reception system, comprising:

a transmission line decoding processing section configured to carry out, for an OFDM signal generated by modulating a common packet sequence configured from a packet common to a plurality of streams and a data packet sequence configured from a plurality of packets individually unique to the plural streams and acquired through a transmission line, a transmission line decoding process including at least a decoding process of the packet streams; and information source decoding processing circuitry configured to carry out, for the signal for which the transmission line decoding process is carried out, an information source decoding process including at least a process of decompressing compressed information into original information;

said transmission line decoding processing section including a buffer configured to accumulate packets of the common packet sequence and the data packet sequence obtained by demodulating the OFDM signal acquired through the transmission line, a memory configured to retain correction information for correcting out-of-synchronism between the common packet sequence and the data packet sequence obtained from particular packets of the common packet sequence and the data packet sequence upon reading out of the packets accumulated in said buffer, the correction information including a difference value of TTOs (Time to Output) added to the particular packets of the common packet sequence and the data packet sequence which are in synchronism with each other depending upon the TTOs, and correction circuitry configured to correct the out-of-synchronism of the packet which suffers from the out-of-synchronism of the packets based on the correction information retained in said memory.

10. A reception system, comprising:

a transmission line decoding processing section configured to carry out, for an OFDM signal generated by modulating a common packet sequence configured from a packet common to a plurality of streams and a data packet sequence configured from a plurality of packets individually unique to the plural streams and acquired through a transmission line, a transmission line decoding process including at least a decoding process of the packet streams; and a display or speaker configured to output an image or sound based on the signal for which the transmission line decoding process is carried out;

said transmission line decoding processing section including a buffer configured to accumulate packets of the common packet sequence and the data packet sequence obtained by demodulating the OFDM signal acquired through the transmission line, a memory configured to retain correction information for correcting out-of-synchronism between the common packet sequence and the data packet sequence obtained from particular packets of the common packet sequence and the data packet sequence upon reading out of the packets accumulated in said buffer, the correction information including a difference value of TTOs (Time to Output) added to the particular packets of the common packet sequence and the data packet sequence which are in synchronism with each other depending upon the TTOs, and correction circuitry configured to correct the out-of-synchronism of the packet which suffers from the out-of-synchronism of the packets based on the correction information retained in said memory.

11. A reception system, comprising:

a transmission line decoding processing section configured to carry out, for an OFDM signal generated by modulating a common packet sequence configured from a packet common to a plurality of streams and a data packet sequence configured from a plurality of packets individually unique to the plural streams and acquired through a transmission line, a transmission line decoding process including at least a decoding process of the packet streams; and recording circuitry configured to record the signal for which the transmission line decoding process is carried out;

said transmission line decoding processing section including a buffer configured to accumulate packets of the common packet sequence and the data packet sequence obtained by demodulating the OFDM signal acquired through the transmission line, a memory configured to retain correction information for correcting out-of-synchronism between the common packet sequence and the data packet sequence obtained from particular packets of the common packet sequence and the data packet sequence upon reading out of the packets accumulated in said buffer, the correction information including a difference value of TTOs (Time to Output) added to the particular packets of the common packet sequence and the data packet sequence which are in synchronism with each other depending upon the TTOs, and correction circuitry configured to correct the out-of-synchronism of the packet which suffers from the out-of-synchronism of the packets based on the correction information retained in said memory.

12. The reception apparatus according to claim 1, wherein the correction information includes addresses of said buffer when the packets of the common packet sequence and the data packet sequence which are in synchronism with each other are written into said buffer and the difference value that indicates a difference between readout timings of the packets of the packet sequences.

13. The reception apparatus according to claim 1, wherein the common packet sequence and the data packet sequence are Common PLPs and Data PLPs, respectively.

* * * * *